(12) United States Patent
Subramanian et al.

(10) Patent No.: US 12,715,049 B2
(45) Date of Patent: Aug. 25, 2026

(54) POWER TONG APPARATUS AND METHOD OF USING SAME

(71) Applicant: Premiere, Inc., Houston, TX (US)

(72) Inventors: Jayaram Subramanian, Houston, TX (US); Scott A. Lowerison, Houston, TX (US); Lee J. Matherne, Houston, TX (US); Sidney C. Ramos, Houston, TX (US); Ernesto M. Martinez, Houston, TX (US); Elam A. Sowell, Houston, TX (US)

(73) Assignee: PREMIERE, INC., Houston, TX (US)

( * ) Notice: Subject to any disclaimer, the term of this patent is extended or adjusted under 35 U.S.C. 154(b) by 792 days.

(21) Appl. No.: 17/635,643

(22) PCT Filed: Aug. 17, 2020

(86) PCT No.: PCT/IB2020/057727
§ 371 (c)(1),
(2) Date: Feb. 15, 2022

(87) PCT Pub. No.: WO2021/033126
PCT Pub. Date: Feb. 25, 2021

(65) Prior Publication Data

US 2022/0290512 A1 Sep. 15, 2022

Related U.S. Application Data

(60) Provisional application No. 62/887,747, filed on Aug. 16, 2019.

(51) Int. Cl.
*B23B 31/12* (2006.01)
*E21B 19/16* (2006.01)

(52) U.S. Cl.
CPC ........ *B23B 31/1269* (2013.01); *E21B 19/164* (2013.01); *E21B 19/165* (2013.01); *E21B 19/161* (2013.01)

(58) Field of Classification Search
CPC . B23B 31/1269; E21B 19/164; E21B 19/165; E21B 19/161
(Continued)

(56) References Cited

U.S. PATENT DOCUMENTS 2,703,221 A 3/1955 Gardner
3,180,186 A 4/1965 Catland
(Continued)

FOREIGN PATENT DOCUMENTS

EP 20854311 1/2023
WO WO PCT/IB2020/057727 8/2021

OTHER PUBLICATIONS

Subramanian et al., U.S. Appl. No. 62/887,747, filed Aug. 16, 2019, titled "Power Tong Back-Up Assembly", 40 pages.

*Primary Examiner* — Hadi Shakeri
(74) *Attorney, Agent, or Firm* — Wells St. John P.S.

(57) ABSTRACT

A power tong assembly has a transmission box having a plurality of speeds. A gear train completely encircles a rotary gear by including idler gears, fluid lines and actuating mechanisms within a tong door, which itself can be remotely operated. Cam roller assemblies can be inversely mounted into cage plates and a support race can be mounted into an opening, thereby eliminating the need to cut a groove in a rotary gear. Filler blocks can be inserted adjacent to gears to catch and redirect slung grease from gears back to said gears, while dampening noise and reducing the misuse of grease, thereby increasing effectiveness of lubrication. A make and break actuator assembly can be housed on the power tong body such that it is completely covered from external damage except when momentarily activated. A symmetric rotary gear, rotary gear inserts, cam shoe inserts and over-travel cam stops are provided.

23 Claims, 28 Drawing Sheets

(58) Field of Classification Search
USPC .......................................................... 81/57.18
See application file for complete search history.

(56) References Cited

U.S. PATENT DOCUMENTS

| | | | | |
|---|---|---|---|---|
| 3,261,241 | A | 7/1966 | Catland | |
| 4,445,403 | A * | 5/1984 | Janzen | E21B 19/164 81/57.2 |
| 4,478,111 | A | 10/1984 | Wells | |
| 4,487,092 | A * | 12/1984 | Neves | E21B 19/164 384/610 |
| 5,172,613 | A * | 12/1992 | Wesch, Jr. | B25B 13/5075 81/57.33 |
| 6,446,524 | B1 * | 9/2002 | Gravouia | F16H 57/02004 81/57.33 |
| 6,619,160 | B1 | 9/2003 | Buck et al. | |
| 9,528,332 | B2 * | 12/2016 | Richardson | E21B 19/164 |
| 9,890,600 | B1 * | 2/2018 | Tran | E21B 19/164 |
| 2003/0177870 | A1 | 9/2003 | Neves | |
| 2007/0228753 | A1 | 10/2007 | Dugal | |
| 2018/0355684 | A1 | 12/2018 | Pohnert et al. | |
| 2019/0136649 | A1 | 5/2019 | Weddle et al. | |

* cited by examiner

Fig. 2
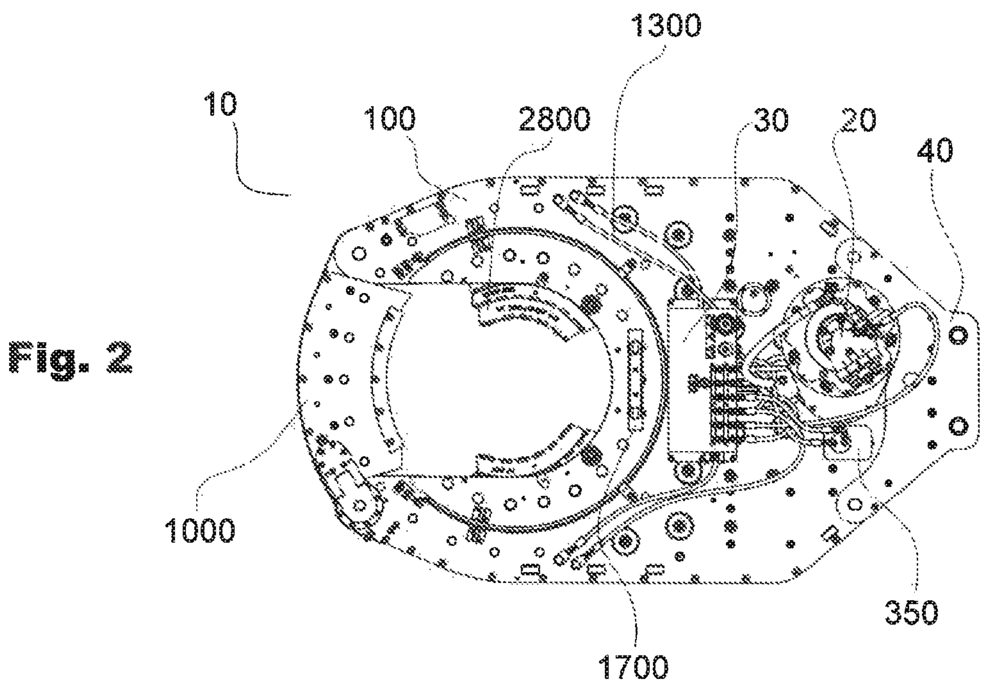
Fig. 2a
Fig. 2b
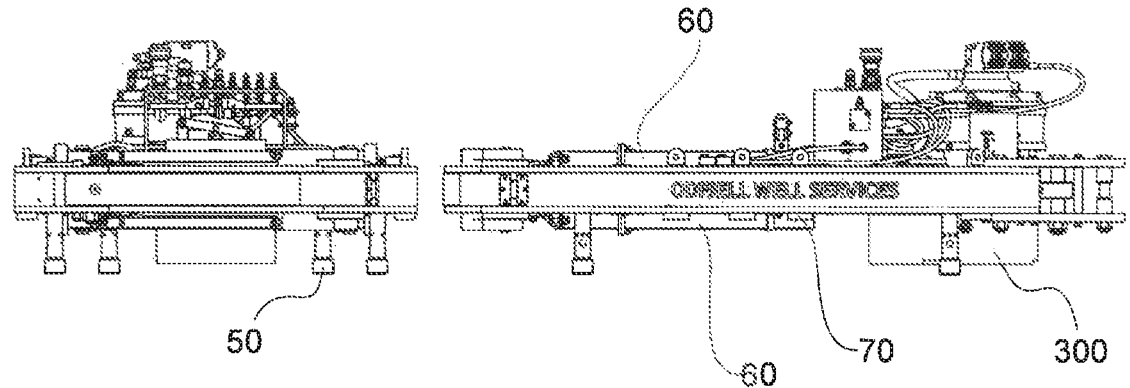

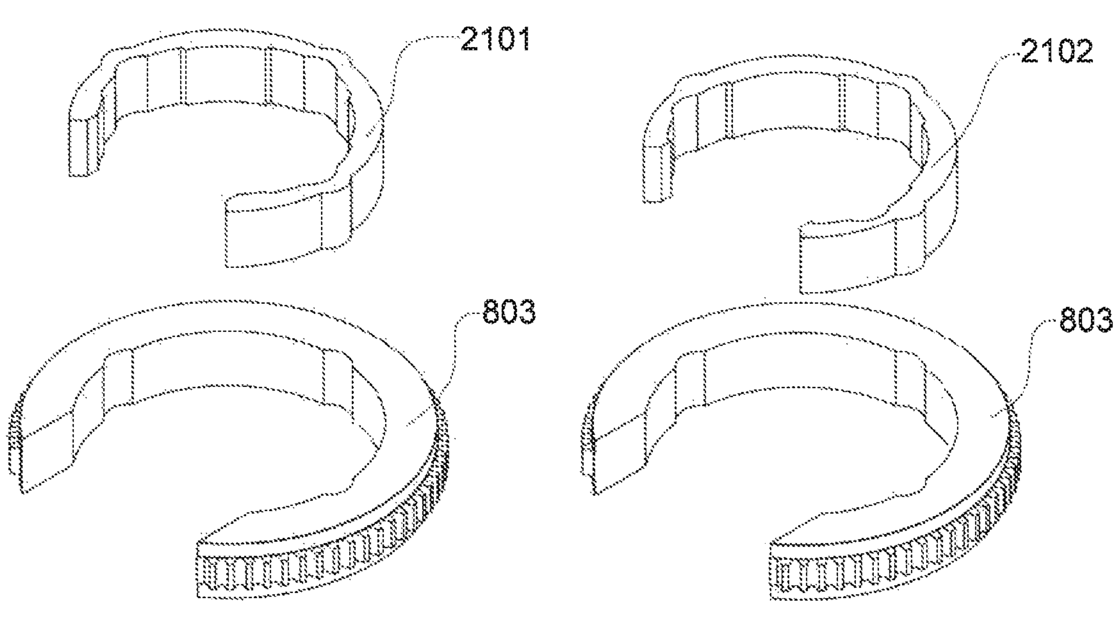
Fig. 21
Fig. 21a
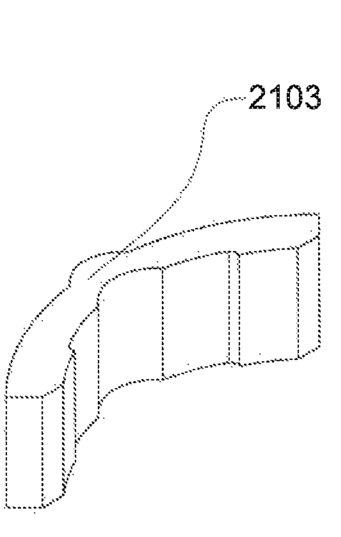
Fig. 21b
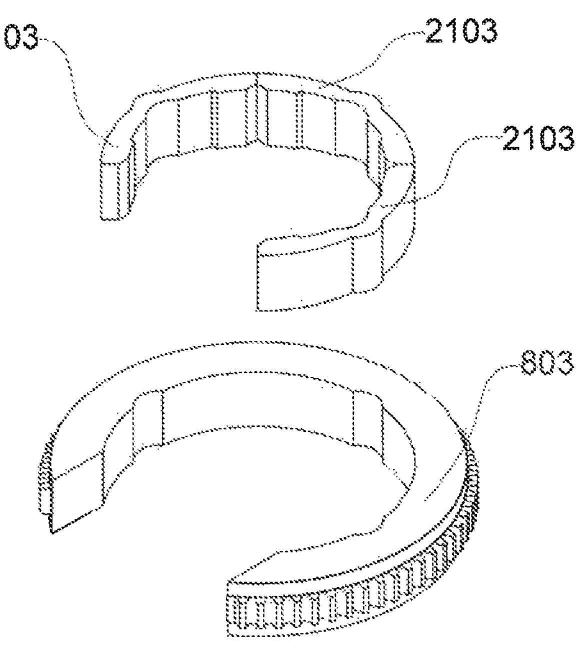
Fig. 21c

22" FOR 22"
18 5/8" JAW
14" THRU 13 3/8" JAW
2800
2801
2825
2850
2853
2852
2851
2204
2829
2827
2828
2826
2804
2802
2803

POWER TONG APPARATUS AND METHOD OF USING SAME

CROSS REFERENCES TO RELATED APPLICATION APPLICATIONS

This application is a 35 U.S.C. $371 of and claims priority to PCT International Application Number PCT/IB2020/057727, filed 17 Aug. 2020 (17.08.2020), was published in English, and which claims priority to and the benefit of U.S. provisional patent application Ser. No. 62/887,747, filed Aug. 16, 2019, the teachings of which are incorporated herein by reference.

BACKGROUND OF THE INVENTION

1. Field of the Invention

The present invention pertains to equipment for use drilling wells penetrating subterranean formations including, without limitation, oil and gas wells. More particularly, the present disclosure pertains to power tongs having modular components.

2. Description of Related Art

The present invention relates to modular power tongs commonly used in the oil and gas industry to screw and unscrew threaded connections such as those utilized on tubing, casing drill collars and drill pipe. Power tongs have been used for many years to grip and rotate tubular members, often while applying significant compressive and torque force(s) to said tubular members; in some cases, said compressive and torque forces can be applied to tubular members simultaneously.

Although power tongs can embody many different designs, said tongs typically share a number of common characteristics. Typically, a motor runs a gear train that squeezes jaws against the outer surface of a threaded tubular segment situated above a mating threaded tubular segment. The tong applies torque forces to said upper tubular segment (above a lower mating tubular segment) to rotate said upper tubular segment in either a clockwise or counterclockwise direction. Likewise, another (second) set of jaws can be fixed about the lower tubular segment to hold said lower tubular segment static relative to its mate—this second set of jaws is sometimes referred to as a backup tong. The aforementioned arrangement allows tongs to securely grip the tubular members, thereby allowing a user to rotate the upper tubular segment relative to said lower tubular segment, all while applying a desired amount of torque at a given velocity.

Conventional power tongs typically comprise an open throat rotary gear with a pinion gear and at least two idler gears in a four-gear diamond formation with the pinion gear and rotary gear on top and bottom of the diamond formation, respectively. The two idler gears are positioned, on the left and right of the diamond formation, in such a manner that when the open throat of the ring passes by one of the idler gears the other idler gear is still engaged with the rotary gear and the pinion gear. However, this configuration limits the reliability and torque capacity of the tong to the strength of a single tooth of the idler gear and a single tooth of the pinion gear. Additionally, for the two idler gears to span the distance of said open throat, the idler gears must be relatively large in diameter and may require additional gears in a line configuration to the pinion gear.

The rotary gear actuates the jaws, typically two or three in cylindrical pockets, within a cage plate. The jaws will travel radially onto and off of a tubular segment in a predetermined manner. The conventional jaws will typically travel in a straight radial path, or pivot into place to contact the surface to be gripped, the jaws fashioned such that a cam located opposite the jaw insert(s) interacts with a surface having a cam profile along the inner diameter of the rotary gear, defining the amount of radial travel of the jaws.

In order to generate sufficient forces required and preserve the utility of the device, tong bodies and their gear trains typically become very large, expensive and heavy—and the resultant size and footprint of a power tong also grows considerably. Space is generally at a premium on a drilling rig floor where a power tong is located. As a result, the ability to use power tongs having high torque capacity is frequently limited by available space and clearances.

SUMMARY OF THE PRESENT INVENTION

The present instant invention generally comprises a modular power tong assembly wherein the weight, size and cost of said power tong are greatly reduced, while torque capacity and strength are greatly increased, relative to other power tongs having similar capabilities for given sizes, weights and grades of tubular. It is to be understood that the apparatus of the present invention may be powered, energized and/or actuated by means of hydraulic fluid, water, air or electricity. Accordingly, the use of the term "hydraulic" in this description should be read to optionally include use any of these methods and is not intended to be limiting in any manner.

A transmission box housing of the present invention has as many speeds as dictated by the number of drive gears held within a shift gear assembly. In a preferred embodiment, two drive gears are employed: a high speed gear and low speed gear. High speed allows for quick spin up of a tubular and accompanying threaded connection, while low speed allows elevated torque generally needed at the end of a thread make-up cycle or the beginning of a breakout cycle. Switching between high speed and low speed with conventional tongs typically requires nearly stopping tong rotation and unavoidable grinding of gears and degradation of interactive gears and/or splines.

In a preferred embodiment, the present invention further comprises a gear train which completely encircles a rotary gear by including idler gears within the tong door. A power tong door hinge utilizes a rotary actuator or cylinder to remotely operate a tong door, all fluid lines and actuating mechanisms protected within the tong body. Said power tong door hinge can further utilizes a rack and pinion system to remotely operate said tong door, all fluid lines and actuating mechanisms protected within the tong body.

Cam roller assemblies can be inversely mounted into cage plates and a support race can be mounted into an opening between top plate and bottom plates eliminates the need to cut a groove in the rotary gear. A support race acts as a sacrificial addition to the tong plates to avoid expensive costs to maintain cam rollers. Yoke rollers can be beneficially mounted in the top and bottom cage plates to reduce cage plate friction during rotation.

Filler blocks can be inserted adjacent to gears to catch and redirect slung grease from gears back to said gears, while dampening noise and reducing the misuse of grease, thereby increasing effectiveness of lubrication. The tong assembly of the present invention further comprises a series of gear segments that can replace an existing gear of given flank height, thereby reducing the cost to replace gears that only present damage to a section of their height or other isolated portion.

The present invention further comprises a novel method for activating a make and break mechanism. Unlike conventional mechanisms, the make and break actuator assembly of the present invention can be housed on the tong body such that it is completely covered from external damage except when momentarily activated. A rotating cylinder and swing arm system enable such safe operation. A rocker arm assembly is designed with ramps and transfer balls on rocker arm base that reduce friction, potential spark hazards due to impact and reduce rotating cylinder size to enable full actuation. The present invention enables remote operation thereby reducing the risk to personnel operating the power tong.

A symmetric rotary gear enables reversibility of said rotary gear by permitting reinstallation up-side down, thereby improving the useable life of said gear. The leading gear flank of the make side which is most susceptible to wear can be reversed to the break side gear flank and vice-versa. The break side cam surfaces can be reversed to become the make side cam surfaces and vice-versa to enable longer life. The make and break groove added to the bottom of the rotary gear allow fresh life of a surface that is susceptible to wear.

Rotary gear inserts allow for worn cam surfaces on an existing rotary gear, conventional or of the present invention, to be refurbished to house a suitable low cost insert that represents a fresh cam surface thereby eliminating the need to scrap worn rotary gears. Rotary gear insert and appropriate jaws can be used when tubular members of smaller size than the previously designed range need to be handled, thereby eliminating the need to inventory multiple size power tongs to cover all ranges of tubular sizes. Said rotary gear inserts can be used to change the gripping characteristics of the power tong by modifying the cam surfaces to suit a particular application. Said rotary gear inserts can also be used to change cam surface location to be approximately 120 degrees apart in order to enable a complete wrap of the jaw assembly around the tubular. Segmented rotary gear sections enable the reduction in maintenance cost by requiring replacement of a worn segment of the rotary gear alone.

Cam shoe inserts for power tong jaws have a smaller profile than a jaw roller-pin mechanism, thereby reducing the overall size and weight of the power tong. Surface contact between cam shoe insert with matching mating profile with the cam surface on the rotary gear, reduces contact stresses on both components, thereby improving service life compared to roller-pin based jaw design or solid jaw design. Further, said cam shoe inserts are designed to be replaceable thereby reducing replacement cost of conventional solid jaw design. Said cam shoe inserts can be designed to have various thicknesses (such as on the make side vs break side) that enables the change of gripping force on a tubular for a given application. Additionally, cam shoe inserts can comprise a pocket and divots that enables collection of grease and debris to save mating surface from wear and damage; this also helps reduce the hydraulic pressure developed in the grease due to mating surfaces and not allowing the grease to break down quickly.

Over-travel stops can be disposed at the end of rotary camming surfaces to prevent cam shoes, jaw rollers and/or solid jaw faces from travelling beyond the camming surfaces that can cause extensive and irrecoverable damage to tubular members. A door alignment mechanism that allows for quick adjustment of the radial and lateral alignment of the door assembly.

The tong assembly of the present invention permits stacking jaw assemblies by means of male dovetail tabs whose geometry mimics a jaw die. Compared to conventional one-piece jaws, the cost and material required to handle a range of tubular sizes can be greatly reduced using this method. Compared to conventional spacers used to bridge the gap between the jaw on tubular and the main holder, this method uses fully functional individual jaws as intermediate spacers thereby reducing overall cost to ownership when considering a range of tubulars to be run.

The tong assembly of the present invention further comprises modified jaw assemblies having grooves for die retainers. This is a stronger die retention method compared to conventional means that cause dies to inadvertently break out of the jaw assembly and fall down into a wellbore.

BRIEF DESCRIPTION OF THE DRAWINGS

The foregoing summary, as well as any detailed description of the preferred embodiments, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

FIG. 2, FIG. 2*a*, FIG. 2*b* depict various views of the modular power tong assembly 10 of the present invention.

FIG. 9 depicts gear train 800 with idler gears 602 and 603 completely encircling rotary gear 803 by also positioning said gears within tong door 900; tong door 900 is open.

FIG. 21 depicts rotary gear 803 with a mating surface to receive rotary gear insert 2101.

FIG. 21*a* depicts rotary gear 803 with a mating surface to receive rotary gear insert 2102.

FIG. 21*b* depicts segmented rotary gear insert 2103.

FIG. 21*c* depicts rotary gear 803 with a mating surface to receive segmented rotary gear inserts 2103.

DETAILED DESCRIPTION OF A PREFERRED EMBODIMENT

The present invention generally comprises a modular power tong assembly wherein the weight, size and cost of said power tong are greatly reduced, while torque capacity and strength are greatly increased, relative to other power tongs having similar capabilities for given sizes, weights and grades of tubular. It is to be understood that the apparatus of the present invention may be powered, energized and/or actuated by means of hydraulic fluid, water, air or electricity. Accordingly, the use of the term "hydraulic" in this description should be read to optionally include use any of these methods and is not intended to be limiting in any manner.

Figure 1:
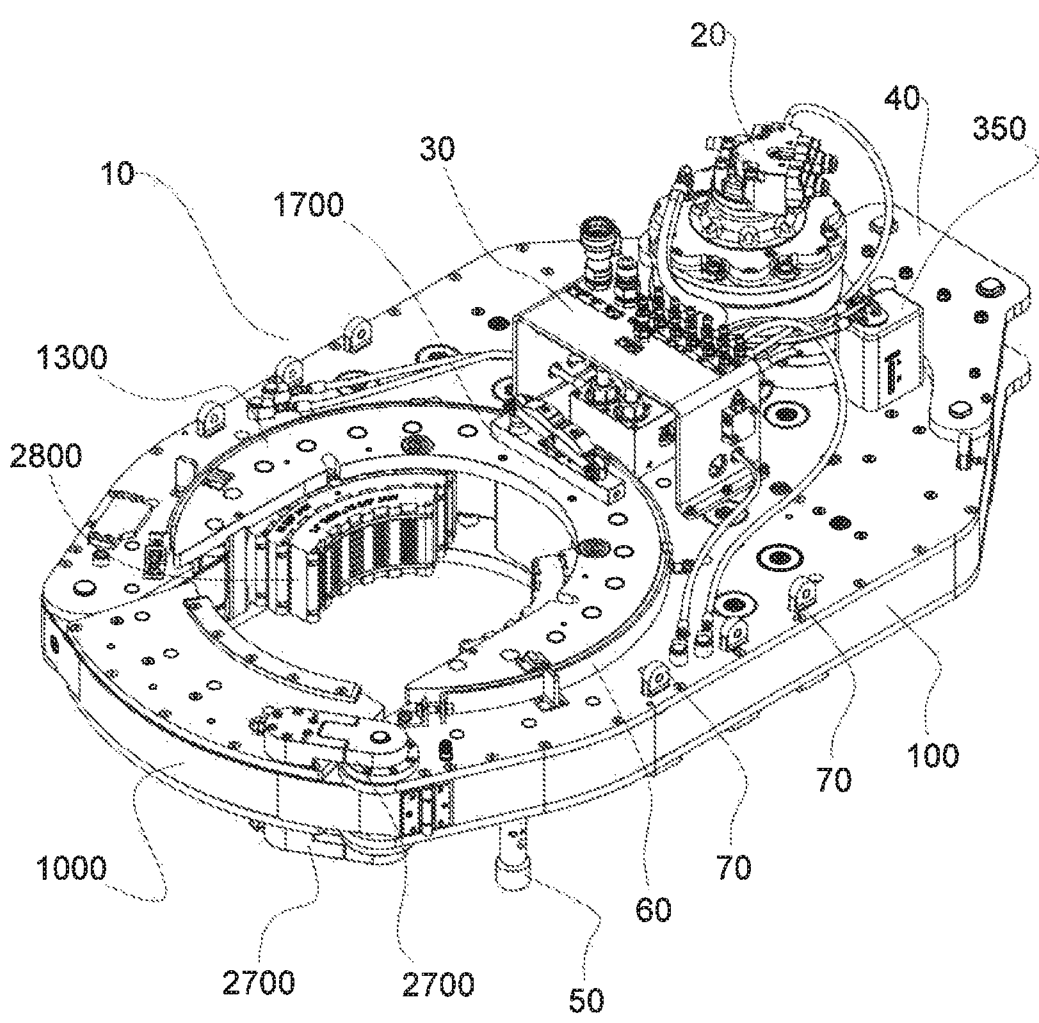
FIG. 1 depicts an isometric view of a modular power tong assembly 10 of the present invention.
Figure 3:
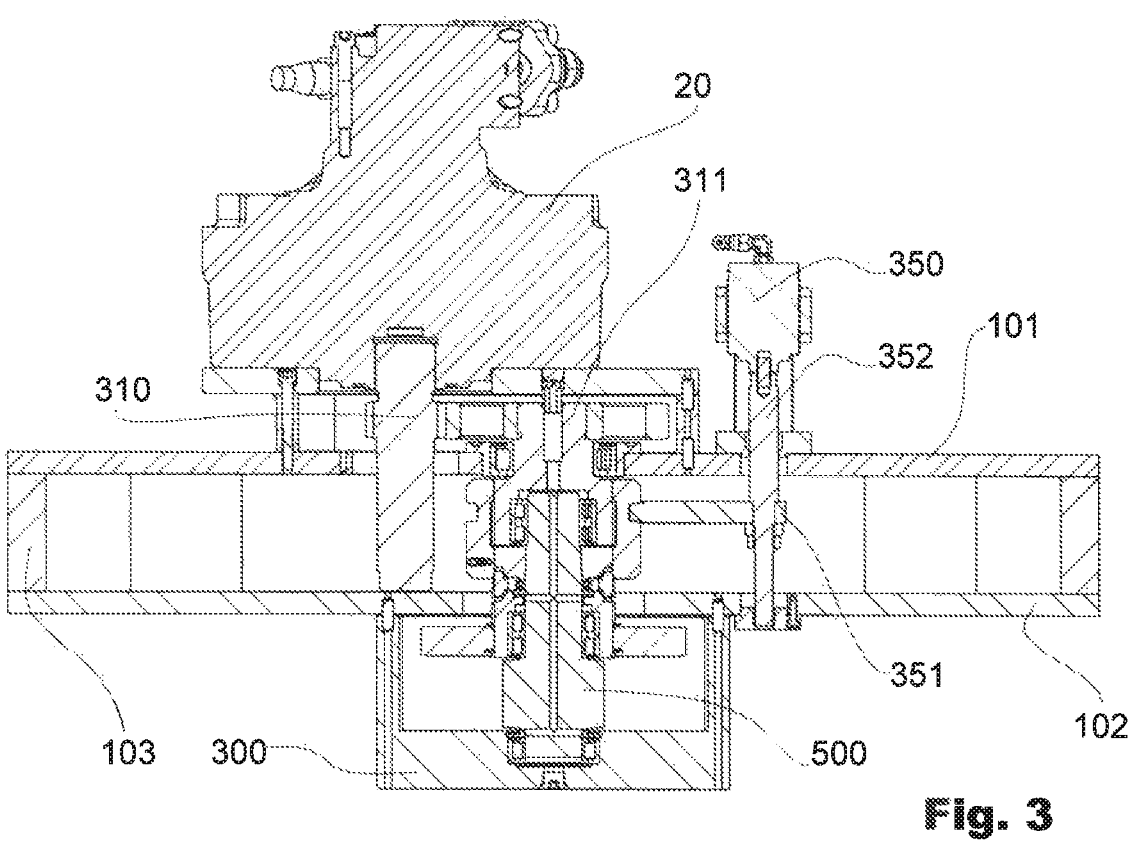
FIG. 3 depicts a section view of the tong body 100 showing the transmission box housing 300 and gear shift assembly 350.
Figure 3A:
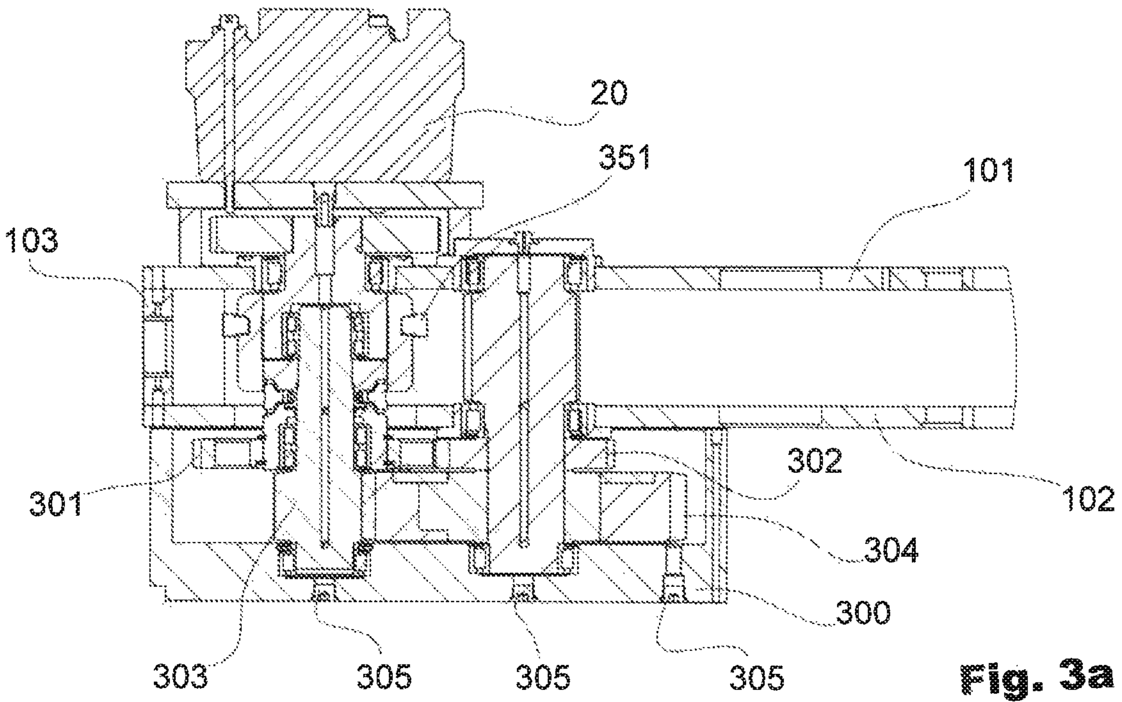
FIG. 3*a* depicts a cross-section view of transmission box housing 300, which contains mating high speed gears 301 and 302 and mating low speed gears 303 and 304.

FIG. 1 depicts an isometric view of a modular power tong assembly 10 of the present invention, while FIGS. 2, 2*a* and 2*b* depict various views of said modular power tong assembly 10 of the present invention. In one embodiment of the present invention, as shown in FIG. 3, a modular transmission box housing 300 can be selectively installed on, or removed from, tong body 100 being mounted either above or below said tong body when in use. This configuration allows for the selection of different combinations of gears in the transmission and tong body designs to suit the requirements of a given installation and/or application. Changing a gear within modular transmission box 300 to alter drive characteristics can be done safely and quickly.

Separating transmission box 300 from power tong assembly 10 allows all gears in the drive train to be dimensioned with a height nearly equal to the interior span between top and bottom tong plates 101 and 102, thereby increasing the capability of said gears in the power tong assembly 10 to conduct force and minimize loading on gear teeth. Similarly, the gears within transmission box 300 can benefit from gears with a longer axial length or greater face width without being constrained by the height of the tong body 100. Modular transmission box 300 of the present invention enables the drive gears, gears that are critical to tong performance due to stresses endured, to be housed in a sealed, lubricated and contamination free environment thereby enhancing their performance and life. Further, the present invention allows one or more additional transmission boxes 300 to be on hand to be installed to satisfy the performance characteristics of an alternative application (such as, for example, based on tubular characteristics or operational requirements) or to replace a failed transmission alternatively quickly.

Figure 4:
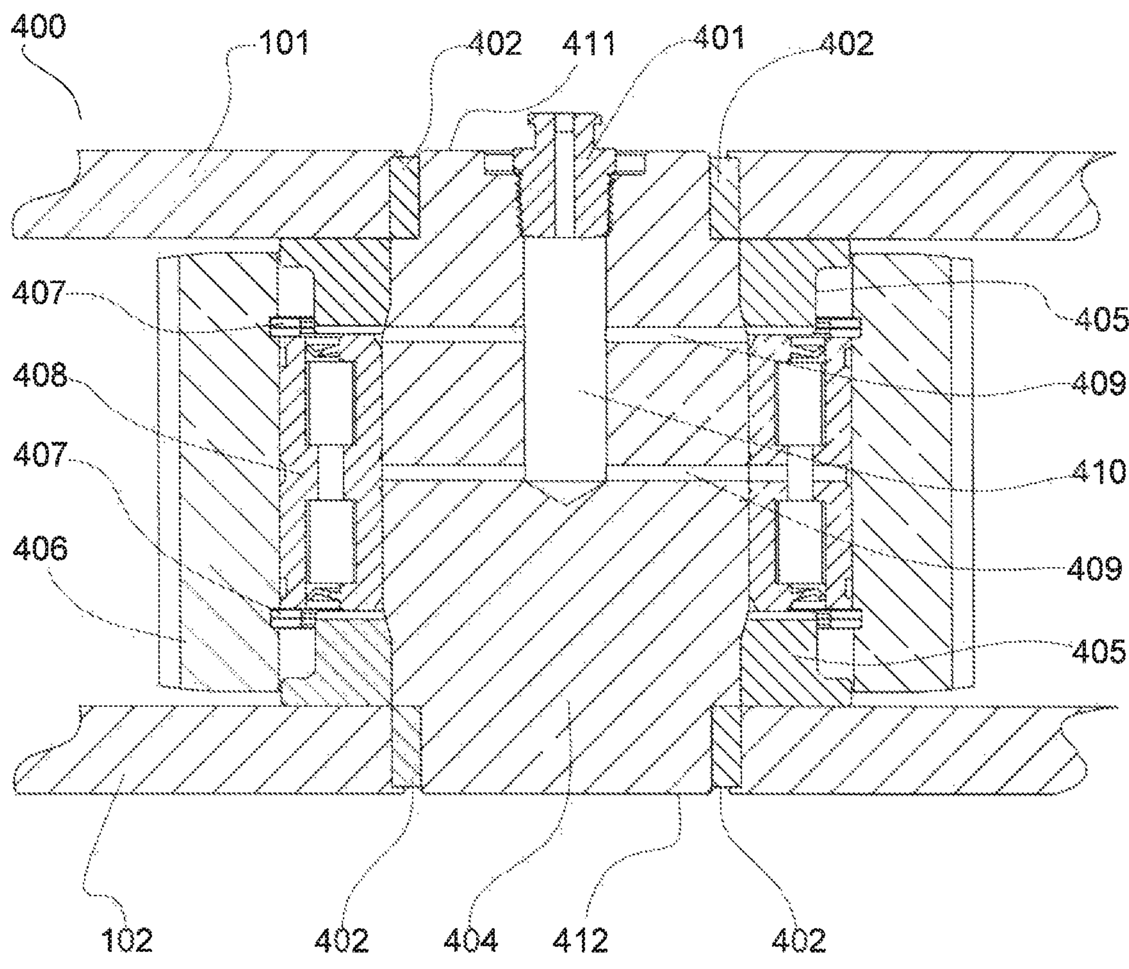
FIG. 4 depicts idler gear assembly 400 with gear shaft 404 spanning the entire height between top plate 101 and bottom plate 102.

Transmission box 300 is located outside tong body 100 and houses high-speed mating gears 301 and 302 and low speed mating gears 303 and 304. This separation eliminates the need to accommodate other gears or utilize half shaft idler gears as in the case of conventional power tong gear trains where two or more gears must rotate in a shared vertical plane without coming into contact. As a result, gear 406 and gear shaft 404 can be dimensioned at a height within tong body 100 nearly equal to the span between tong top plate 101 and tong bottom plate 102 as shown in FIG. 4. Further, a reduced tong body 100 length as measured between tong door assembly 1000 and load cell mount 40 and a shorter profile tong body 100. These factors contribute to power tong 10 of the present invention with a greater torque to weight ratio as compared to other commercially available power tongs suited to join similarly sized tubular members.

As shown in FIG. 4, gear shaft 404 spans the entire length between tong top and bottom plates 101 and 102 and is dimensioned to be fit into wear bushings 402 which are press fit into tong top and bottom tong plates 101 and 102 allowing full height gear 406. Gear shaft 404 is dimensioned with a shaft having a greater OD than a comparable threaded gear shaft and as such increases the amount of torque it can transfer.

Gear shaft ends 411 and 412 are flush with outer tong body 100 with no bolt exposed to the elements avoiding the possibility of physical or corrosive damage. Optionally, wear bushings 402 may be installed intermediate gear shaft 404 and tong top and bottom plates 101 and 102 to preserve the interfacing surfaces in tong body 100 from wear. Additionally, wear bushings 402 may optionally be dimensioned with a flange formed flush to the interior surfaces of tong top and bottom plates 101 and 102. In another embodiment, gear shaft 404 may press fit into upper tong plate 101 and bottom tong plate 102.

Gear 406, bearing 408 and bearing spacers 405 are mounted on gear shaft 404. Bearing spacers 405 serve to centralize bearing 408 and idler gear 406 between the tong top plate 101 and tong bottom plate 102. Further, bearing spacer 405 and adjacent gear shaft 404 surfaces are formed with complimentary mating beveled surfaces, such that; bearing spacers 405 maintain axial positioning of gear shaft 404. Grease chamber 410 collects grease for transfer to bearings via grease ports 409. Grease chamber 410 is supplied by grease nipple 401.

Transmission box 300 of the present invention has as many speeds as dictated by the number of drive gears held within shift gear assembly 500. In the preferred embodiment, two drive gears are employed: high speed gear 301 and low speed gear 303. High speed allows for quick spin up of a tubular and accompanying threaded connection, while low speed allows elevated torque generally needed at the end of a thread make-up cycle or the beginning of a breakout cycle. Switching between high speed and low speed with conventional tongs typically requires nearly stopping tong rotation and unavoidable grinding of gears and degradation of interactive gears and/or splines.

Conventionally, a mechanical lever connected to a yoke enables shift from one speed to another. Such a manual shift usually requires the operator to bring the power tong to a complete halt before shifting or to time the shift based upon feedback against the mechanical controls. However, when a power tong is remotely controlled by the incorporation of a hydraulically actuated yoke mechanism, the absence of sensors to detect feedback and the need for instantaneous shift necessitates the present invention.

Figure 5:
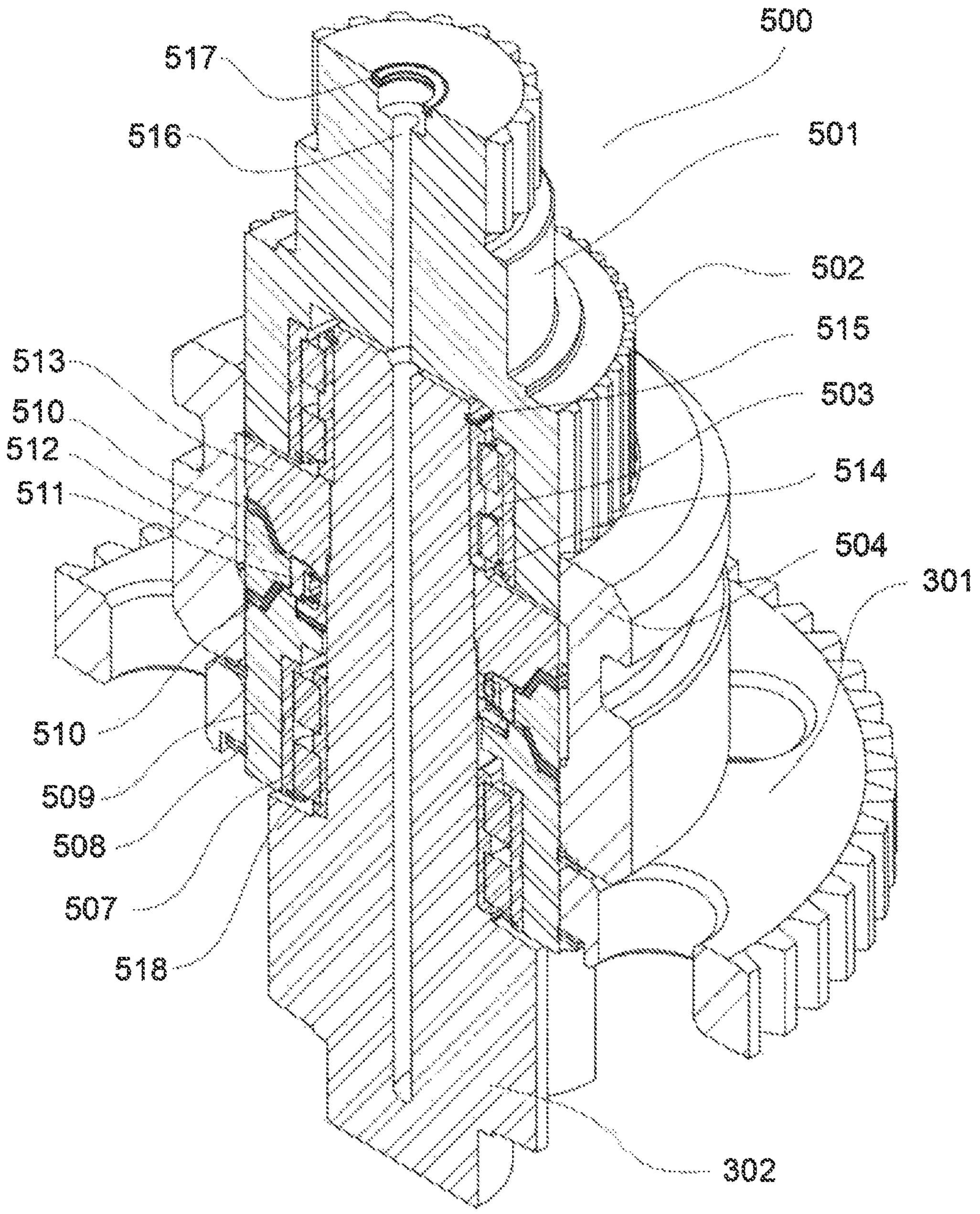
FIG. 5 depicts dual speed gear assembly 500 that utilizes a synchronizing mechanism during the transition between high and low gear speeds by means of synchronizing rings 510.

FIG. 5 depicts shift gear assembly 500 with two gears; high speed gear 301 and low speed gear 303 which are selectively driven by motor gear 501. High speed allows for quick spin up of a tubular and accompanying threaded connection, while low speed allows elevated torque generally needed at the end of a thread make-up cycle or the beginning of a breakout cycle. Shift Coupling 504 rides on the drive spline 502, transferring torque to either low speed union of low speed gear 303 and top synchronizing spline 513, or high-speed union of high-speed gear 301 and bottom synchronizing spline 509. The synchronizing wear rings 510 are located between top synchronizing spline 513, intermediate synchronizing spline 512, and bottom synchronizing spline 509. A smooth transition of the shift coupling 504 between top synchronizing spline 513 to bottom synchronizing spline 509 is enabled by the frictional drag created by synchronizing rings 510 which serve to positionally align intermediate synchronizing splines 512 there between.

A conventional power tong has a rotary gear with an open segment. Such a power tong tends to pitch and roll as the centroid of the rotary gear revolves eccentrically about the longitudinal axis of rotation. The tendency of the power tong to pitch is defined by the weight distribution of the segmented rotary gear. The tendency to roll, however, is primarily governed by the asymmetric distribution of the centrifugal force on the rotary gear about the axis connecting the center of the pinion gear and rotary gear.

Figure 6:
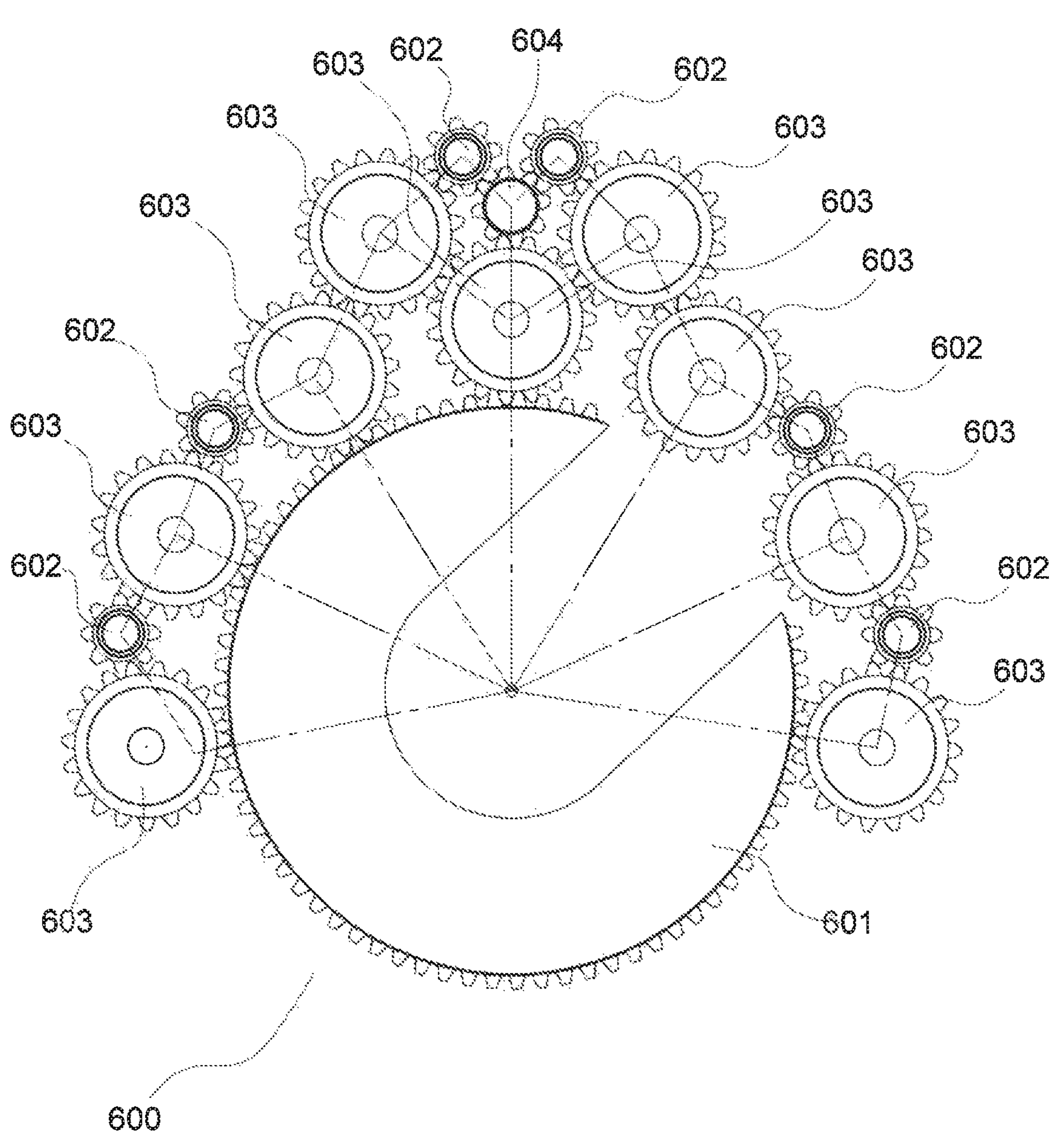
FIG. 6 depicts gear train 600 where pinion gear 604 is connected to rotary gear 601 by means of a plurality of idler gears 602 and 603.

FIG. 6 depicts gear train 600 of the present invention; configured to transmit constant driving force to idler gears 603 on either side of the axis connecting the center of pinion gear 604 and rotary gear 601. Irrespective of the position of rotary gear 601, idler gears 602 and 603 on either side of the said axis transmits a balanced centrifugal force, thereby reducing the tendency of the power tong to roll.

Within certain arc lengths of rotation of a segmented rotary gear in a conventional power tong there is loss of gear contact between rotary gear and mating idler gears. This loss of contact represents the loss of a load path between the rotary gear and a driving pinion gear causing undue stresses on the pinion gear.

Figure 7:
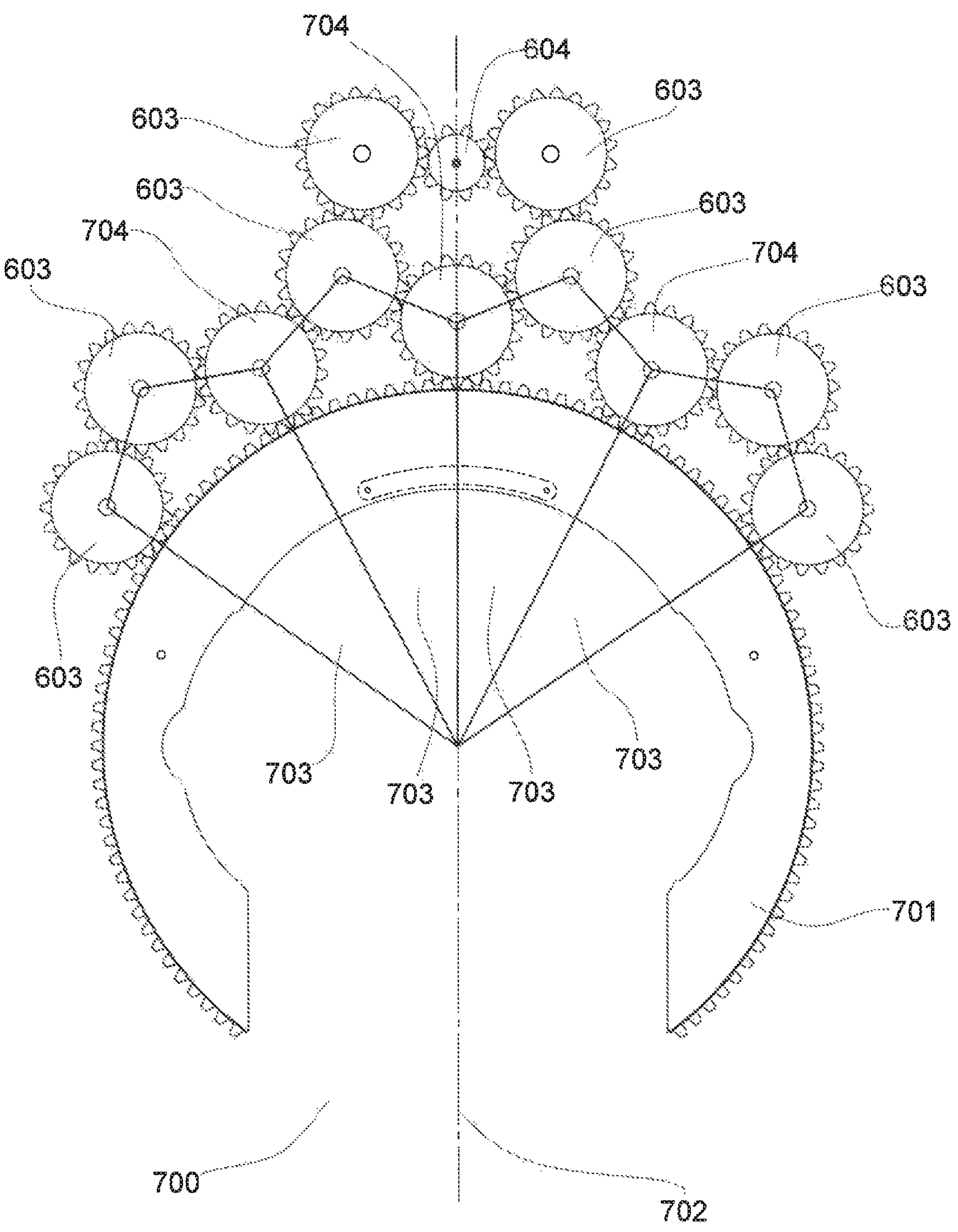
FIG. 7 depicts a series of overlapping diamond pattern 703 of idler gears 603 and 704 about line of symmetry 702, within gear train 700.

Gear train 700 of the present invention as shown in FIG. 7 permits rotatable connection by three or more overlapping diamond patterns 703. A diamond pattern of gears, as disclosed herein, consists of upper idler gear 603 in direct connection or mesh with two idler gears 603 or 704 which, in turn, are likewise in meshing contact with rotary gear 701 through its entire range of rotation. It is said to be an overlapping pattern because each diamond pattern is connected to the diamond pattern adjacent by a shared idler gear 704. Finally, the entire grouping of meshing gears are in meshing connection with two or more idler gears 603 about the pinion 604. As such all gears within the gear train are "daisy-chained" together, in constant meshing contact at all times, serving to distribute the load evenly about the pinion and also on either side of the line of symmetry 702 of the rotary gear 701. The line of symmetry being defined as bisecting either of two halves of pinion gear 604 by an imaginary line passing through pinion gear 604 and the center of the rotary gear 701. The benefits of the current embodiment are achieved without the need to change the gear ratio intermediate the pinion and rotary gears remains unchanged.

Figure 8:
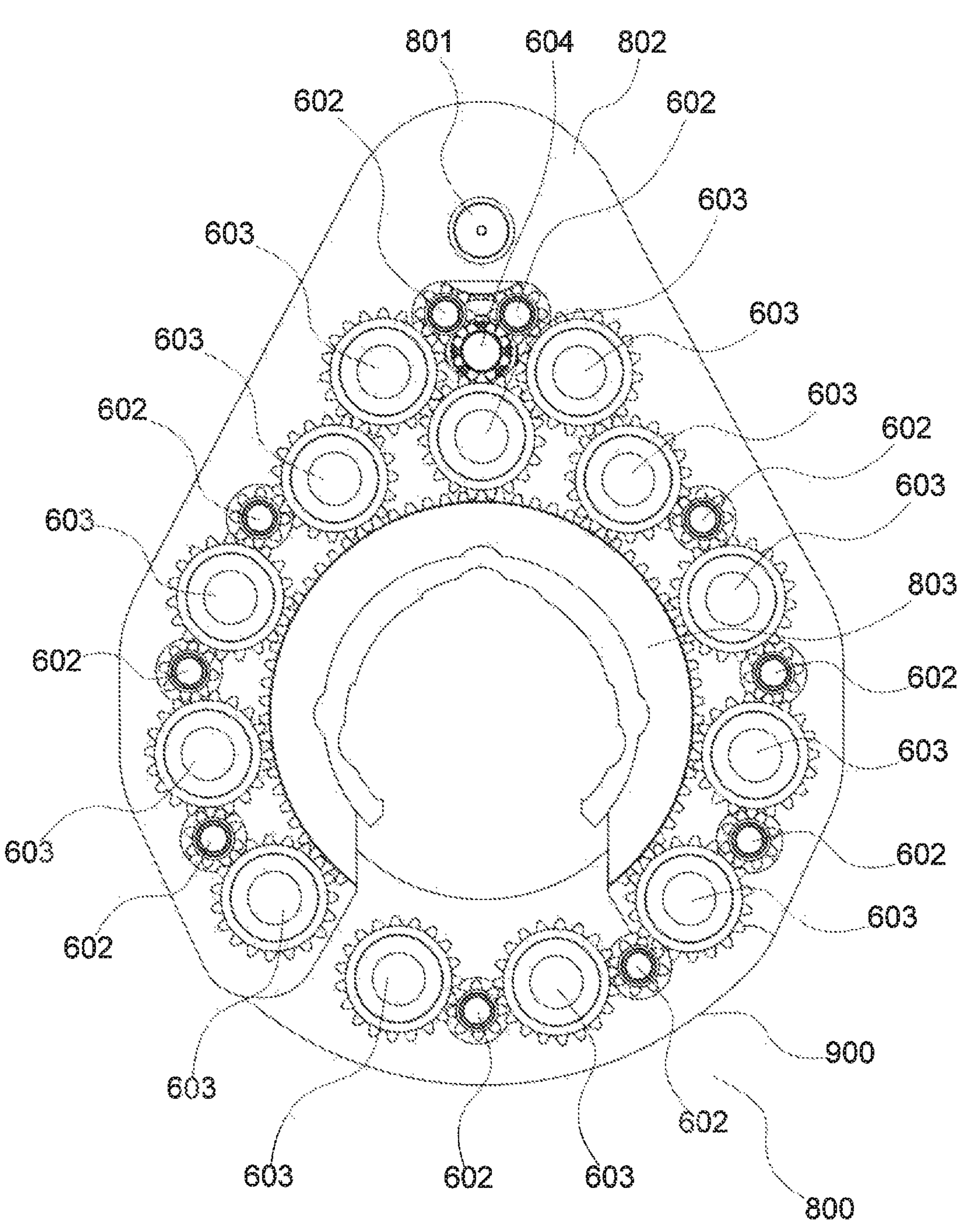
FIG. 8 depicts gear train 800 with idler gears 602 and 603 completely encircling rotary gear 803 by also positioning said gears within tong door 900; tong door 900 is closed.
Figure 9:
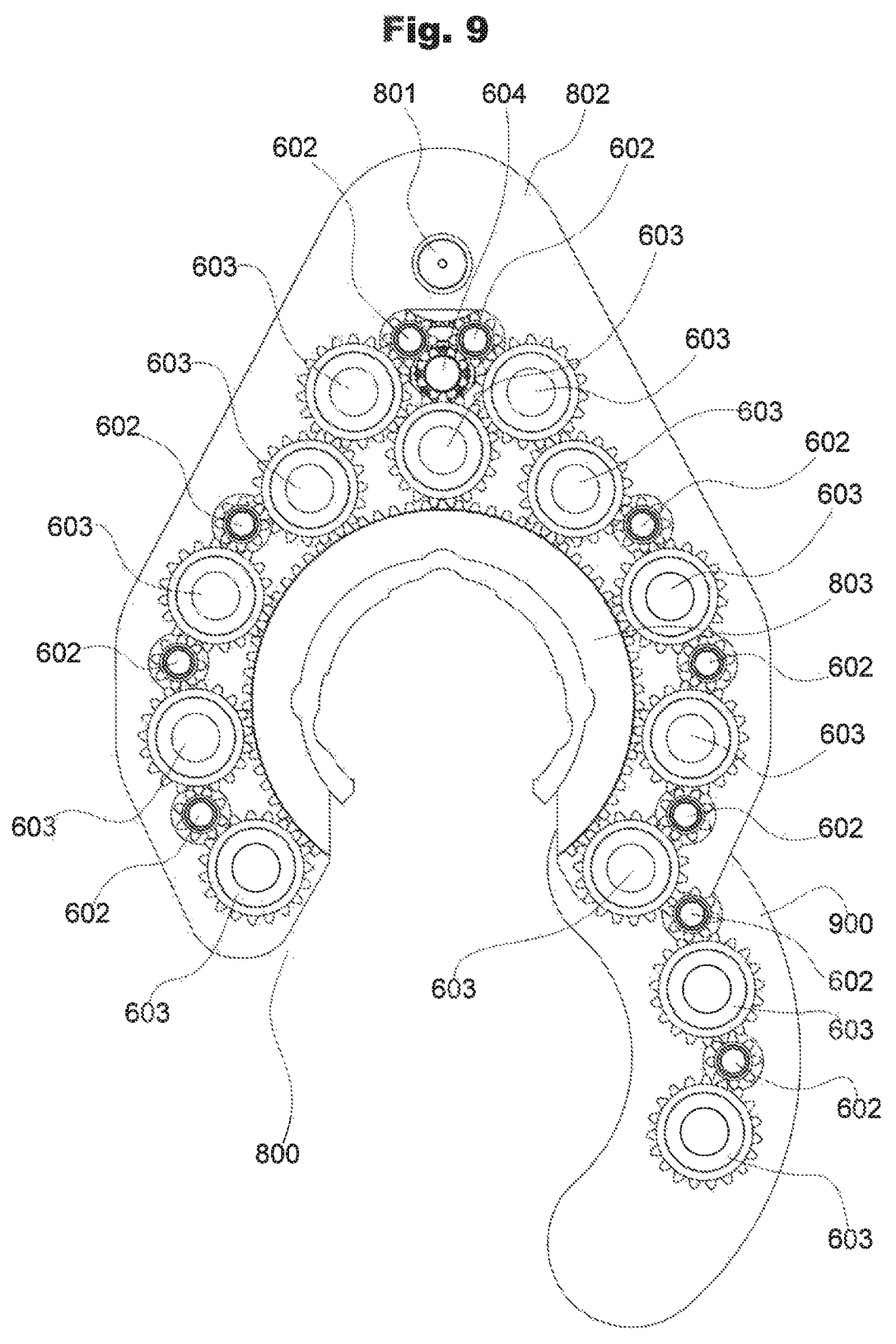
Figures 10, 10A:
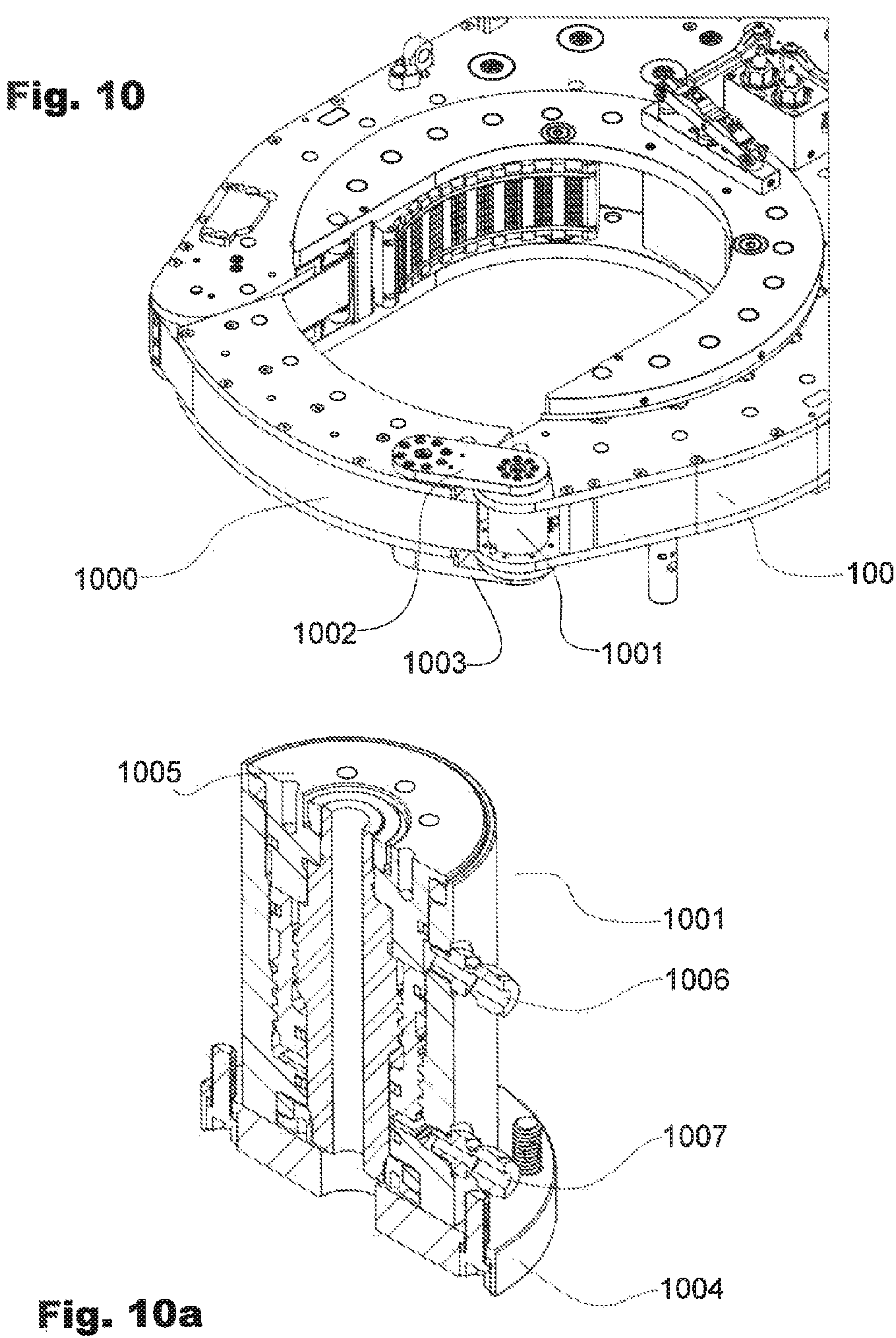
FIG. 10 depicts a tong door assembly 1000 with rotary cylinder 1001 installed as a hinge.
FIG. 10*a* depicts a cross sectional view of rotary cylinder 1001.

Optionally, gear train 800 as shown in FIG. 8 may be configured to substantially encircle the entire rotary gear 803, including along inner perimeter of tong door 900. This configuration provides substantial support to rotary gear 803 reducing its tendency to radially expand at high torque. Selection of appropriate idler gears similar to idler gears 602 and 603 is critical to ensure that the entire gear train stays in meshing contact in the open and closed states of tong door 900 as shown in FIG. 8 and FIG. 9.

The tong door on a power tong is conventionally opened manually or using a hydraulic cylinder with one end attached to the tong door and the other end attached to the tong body. The tong door is optionally opened and/or closed by actuating a cylinder in its respective direction. The tong door is held closed by maintaining the pressure on the retract side of the cylinder and/or a door latch assembly. Conventional designs thus necessitate protrusions on the top and/or bottom of the tong body, which are susceptible to damage from external factors, and have several hazardous pinch points.

The present invention utilizes rotary actuator or cylinder 1001 installed intermediate tong door assembly 1000 and tong body 100 contained completely within tong body 100, thereby eliminating the need for protruding cylinders or other mechanisms. Situating all hydraulic lines that feed power through the fluid ports 1006 and 1007 internally within tong body 100 protects them from external handling damage. Tong door 1000 is contoured around rotary cylinder 1001 such through the entire range of motion from the closed to open state the system does not present any pinch points. Further, the rotary cylinder 1001 is designed to have sufficient rotational stroke such that the open state on the door is defined by the end of stroke internal to the cylinder and not an external stop as in the case of conventional power tong designs. This feature of the present invention makes the mechanism intrinsically safe.

Figures 11, 11A, 11B:
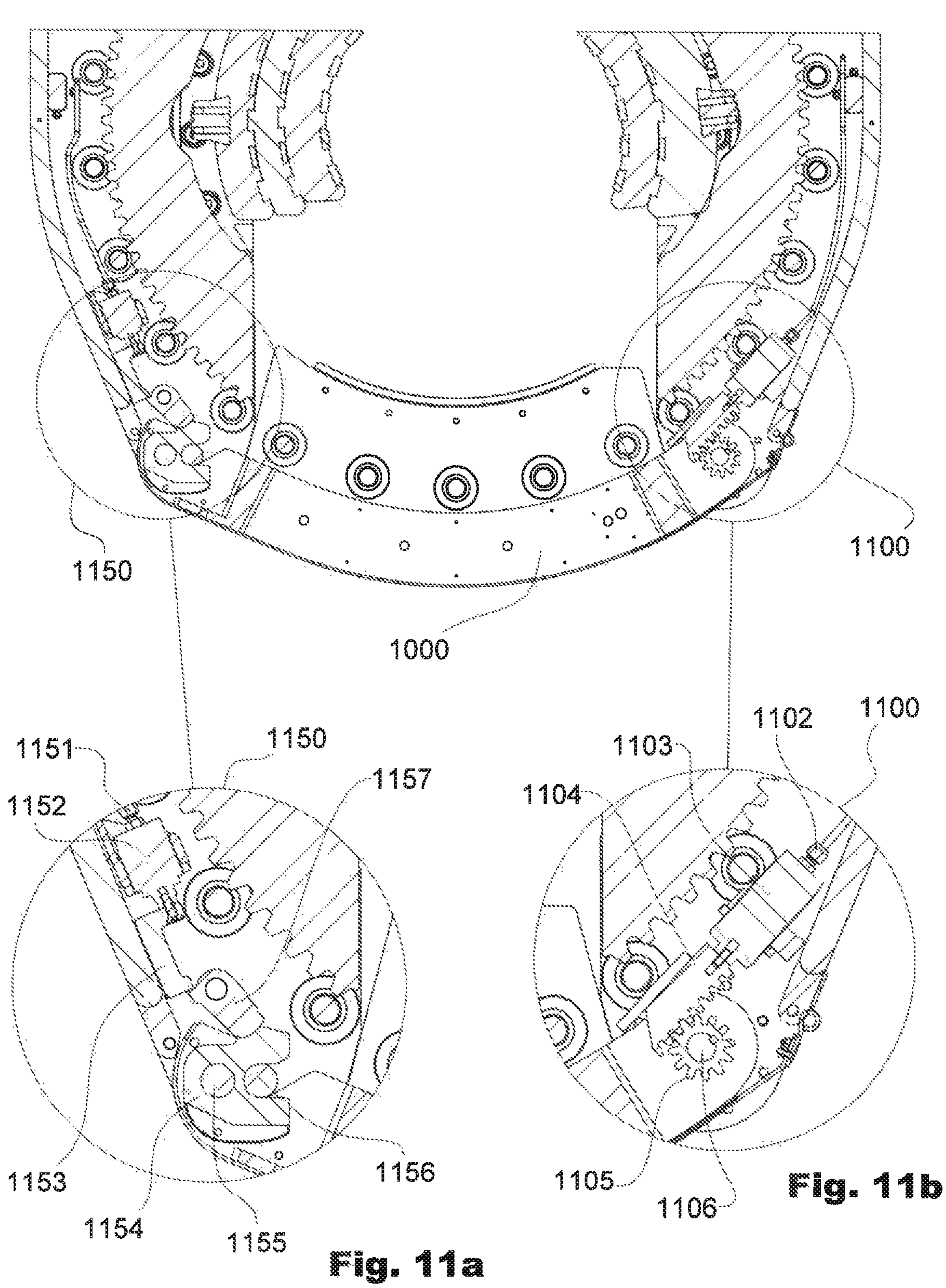
FIG. 11 depicts door actuator assembly 1100 and door latch assembly 1150 for remote operation of tong door assembly 1000.
FIG. 11*a* depicts tong door latch assembly 1150.
FIG. 11*b* depicts tong door actuator assembly 1100.

An alternate embodiment of a door assembly is a rack and pinion system as depicted in FIG. 11. Door latch assembly 1150, located on the opposite side of door actuator assembly 1100 within tong door assembly 1000 affixes to tong body 100.

To close the tong door assembly 1000, door cylinder 1103 shown in FIG. 11*b* is energized to extend rack 1104 and a plurality of teeth thereupon cooperate with pinion gear 1105 to transmit clockwise rotational force through door actuator pin 1106. Said pin is connected to tong door assembly 1000. Door latch 1157 shown in FIG. 11*b* engages against the latch cam 1154 to keep the tong door assembly 1000 in its closed position during rotation of the rotary gear 1451.

To open tong door assembly 1000, latch lever 1153 is energized by latch cylinder 1152. This causes the door latch 1157 to separate from latch cam 1154. A spring pulls the latch cam 1154 to its open position releasing it from latch pin 1156. Door cylinder 1103 is energized to retract rack 1104 and a plurality of teeth thereupon cooperate with pinion gear 1105 to transmit counterclockwise rotational force through door actuator pin 1106. Latch lever 1153 is also spring loaded to roll it clockwise to its open state. This serves to extend tong door assembly 1000 open to a position sufficient to allow unimpeded ingress of a tubular member into the center of the rotary gear. This embodiment also presents a door operation mechanism that is completely contained within tong body 100 rendering it inherently safe from external damage.

Irrespective of the embodiment used on tong door assembly 1000, door cylinder 1103 and latch cylinder 1152 are sequenced using a sequencer valve, allowing the latch to unlock prior to door cylinder 1103 or rotary cylinder 1001 opening tong door 1000. All controls for this tong can be selectively operated remotely or on site, using pneumatically, electrically, or hydraulically.

Many conventional power tongs include so-called "cage plates;" concentric to the rotary gear and support or hold the jaw pivot pins. Conventional cage plates are typically held in concentricity by a series of cam rollers typically a bearing affixed to a threaded shaft and installed into the top and bottom plate, extending into a groove formed in the cage plate. Alternately the cam rollers are installed in the cage plates extending into a groove formed in the rotary gear. Many cam rollers have nuts which protrude under their respective plates, thereby necessitating a clearance groove to be formed into the rotary gear, thereby reducing its strength. Conventional cam rollers may also be screwed directly into the top or bottom plate, which typically reduces their strength. Both mounting modes limit the tong's utility. When high torque is reached the rotary gear or tong body can expand deforming groove in the cage plate and/or impose a shear load on cam roller shafts. This can cause the cam rollers and shafts to bend or break. To control deformation, the torque capacity of the tong must then be limited.

Figure 12:
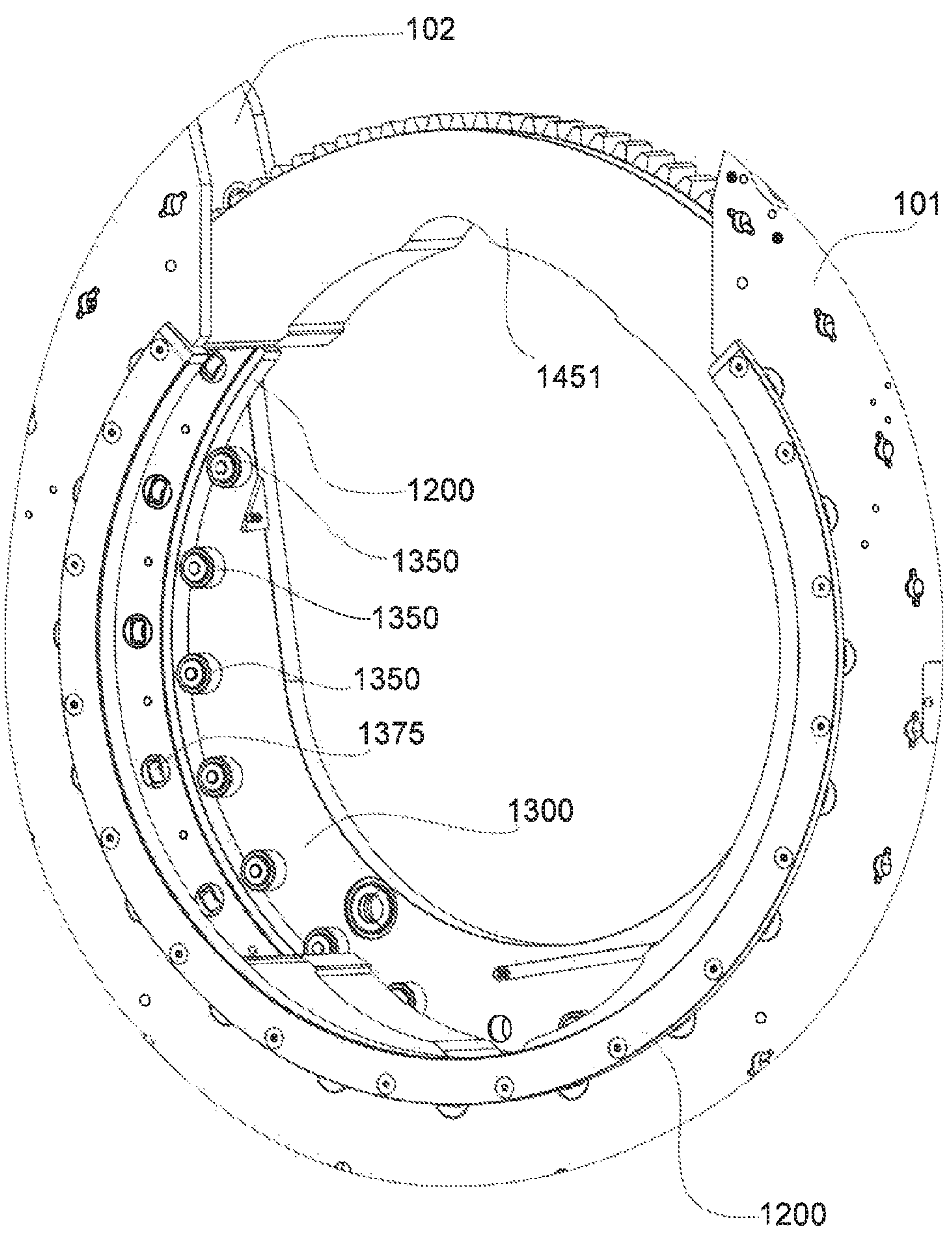
FIG. 12 depicts cage plate support race 1200 with cage plate assembly 1300.
Figures 13, 13A, 13B:
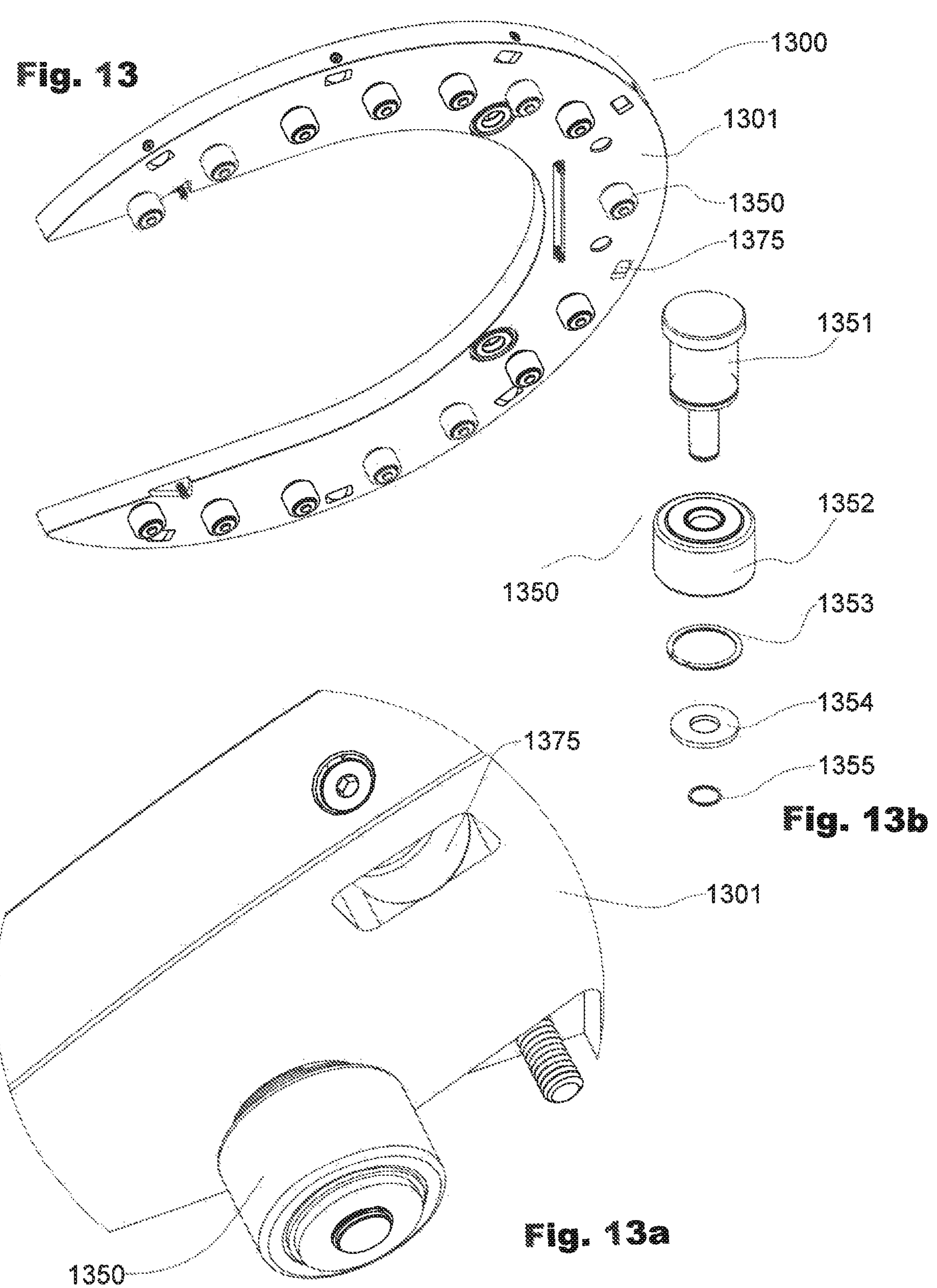
FIG. 13 depicts a series of cage plate yolk roller assemblies 1375 and cam roller assemblies 1350 installed on cage plate assembly 1300.
FIG. 13*a* depicts an enlarged portion of cage plate 1301 showing cage plate yolk roller assembly 1375 and cam roller assembly 1350.
FIG. 13*b* depicts an exploded view of cam roller assembly 1350.

In the present invention, cam roller assemblies 1350 are mounted inversely in cage plate assembly 1300 as shown in FIG. 12. The diametral opening in tong top plate 101 and tong bottom plate 102 is increased and support race 1200 is added to the ID of this opening. Cam roller assembly 1350 rolls on said support race 1200. As a result, the strength of the cage plate is thereby increased as no groove is formed which would otherwise reduce the cross-sectional area. Additionally, a larger cam roller shaft 1351, as shown in FIG. 13*b*, can be used in cam roller assembly 1350, increasing the strength of cam roller 1352. Further, cam rollers 1352 of the present invention are less susceptible to bending or breaking at elevated torques as the mouth of cage plate 1301 has a greater relative cross-section.

A conventional rotary gear and cage plates can be suspended within the tong by several methods including, without limitation, the following: (a) having the rotary gear and cage plate glide on a bed of grease, (b) having the edges of the rotary gear ride on guide rollers, said rollers rotate to the horizontal plane and center the gear, (c) placing wear disks or bushing under the gear or cage plate, and/or thinning the gear, or (d) placing or forming a groove in gear for a wheel to ride on. All of the aforementioned methods reduce torque capacity of the power tong by either introducing friction and drag, and/or removing material from the rotary gear thereby reducing its strength, torque and reliability.

The present invention, as depicted in FIG. 13*a* utilizes cage plate yolk roller 1375, a bearing comprising a roller having a curved or domed surface. Cage plate yolk roller 1375 is fitted into cage plate 1301 which is inserted into top and bottom tong plates 101 and 102; said cage plates 1301 are designed to keep cage plate yolk roller 1375 rolling in the same direction as rotary gear 1451 and located directly above or below rotary gear 1451. Cage plates 1301 also protrude just above or below respective tong plates 101 and 102, spaced equidistant and in numbers sufficient to adequately reduce rolling friction between rotary gear 1451 and cage plates 1301. The low profile of crowned yolk rollers 1375 eliminates the need to remove much needed material and therefore strength from rotary gear 1451. Additionally, the height of rotary gear 1451 can now be made to a height slightly less than top and bottom plates 101 and 102. Also selectively incorporated into cage plates 1301 may be a series of springs and or material that allows the invention to move up or down so as to absorb shock and level rotary gear 1451 within tong body 100.

Figures 14, 14A:
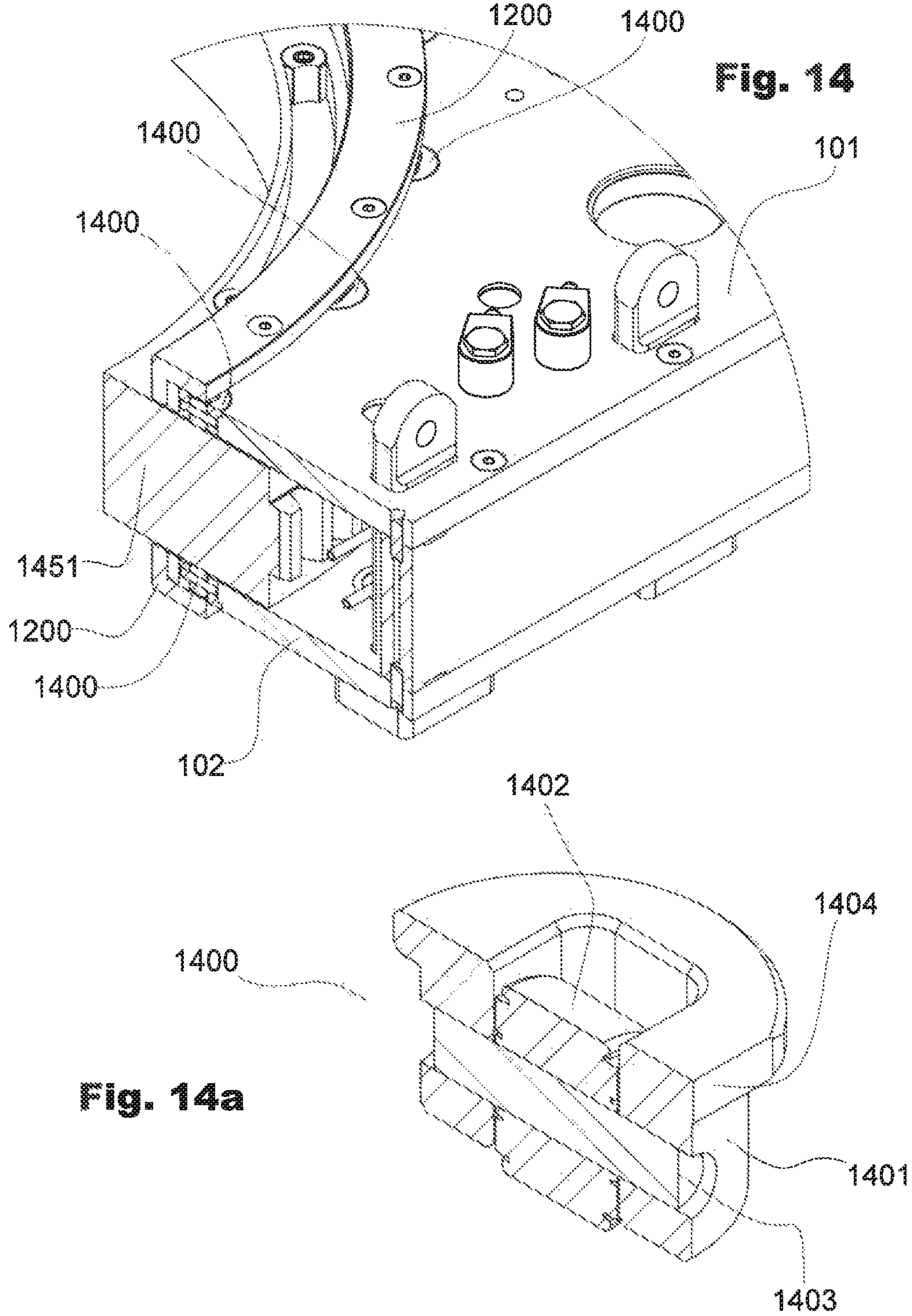
FIG. 14 depicts a close-up section view of rotary yolk roller assembly 1400 installed into bottom plate 102 supporting rotary gear 1451.
FIG. 14*a* shows a cross section view of rotary yolk roller assembly 1400.

The present invention as shown in FIG. 14 utilizes rotary yoke roller 1400 press fit into tong top plate 101 and tong bottom plate 102 located directly above or below rotary gear 1451, spaced equidistant and in numbers sufficient to adequately reduce friction between rotary gear 1451 and tong bottom plate 102. FIG. 14*a* shows rotary yoke roller 1400 comprising yoke roller 1402, a thick hardened outer ring having a curved or domed surface suspended in yoke roller housing 1401 via yoke roller pin 1403. Locating face 1404 enables the rotary yolk roller 1400 to be located radially in the tong top and bottom plates 101 and 102 such that yoke rollers 1402 are aligned in the direction of rotation of rotary gear 1451. The low profile of rotary yoke rollers 1400 further reduces the need to remove material and therefore strength from rotary gear 1451. Likewise, rotary yoke rollers 1400 can further decrease the distance between rotary gear 1451 and tong top and bottom plates 101 and 102.

A typical tong case has large empty areas around the gear train to the rear of the tong. Normally this area is filled with grease; the total volume of grease required is dependent on the size of the tong. Normally when a tong is operated grease is slung centrifugally from the gear onto the walls of the tong leaving a void between the gear and the grease and providing little or no lubrication.

Figures 15, 15A, 15B:
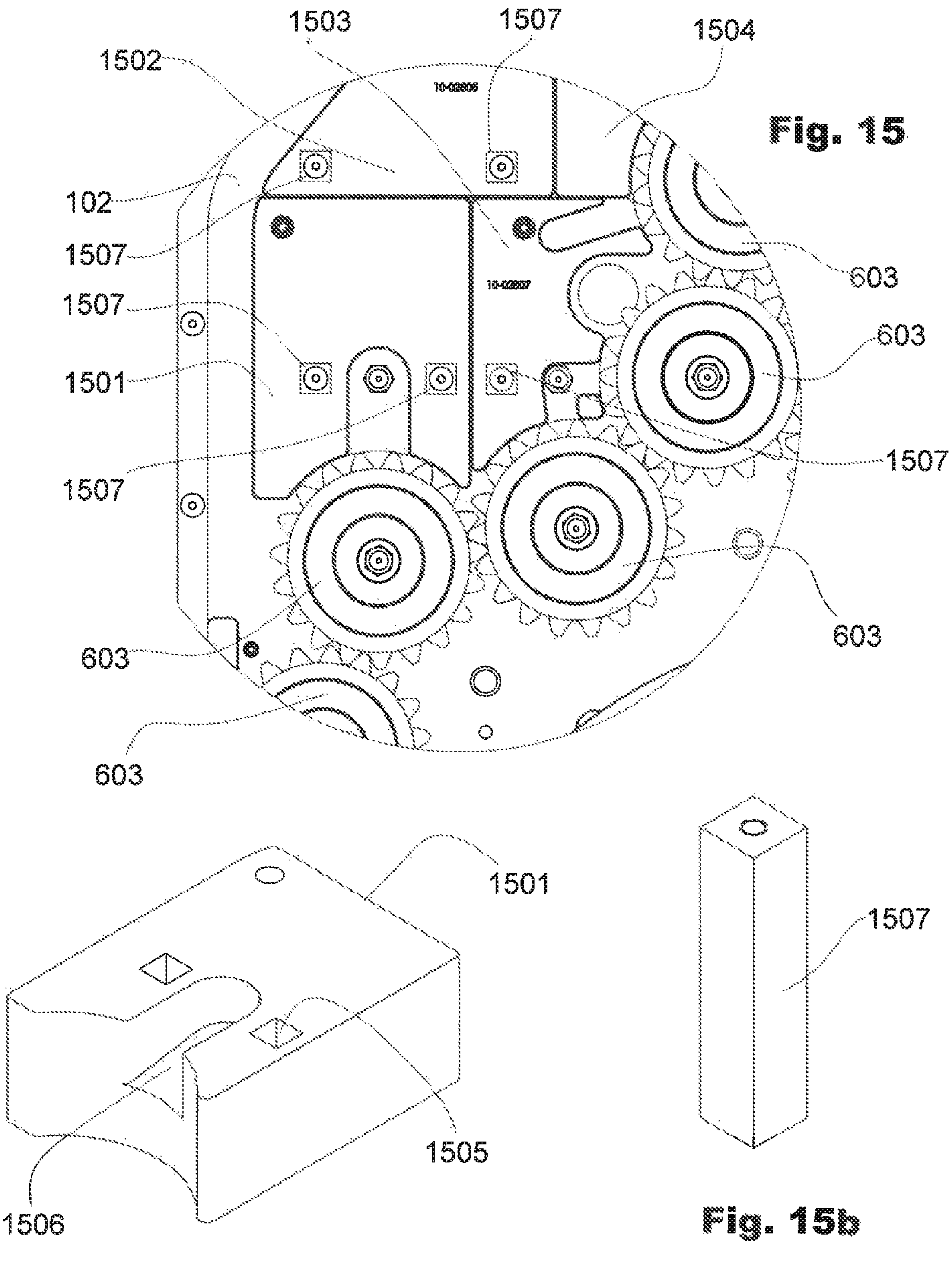
FIG. 15 depicts a partial view of power tong assembly 10 with idler gears 603, support posts 1507, filler blocks 1501, 1502, 1503, and 1504 located inside tong body 100.
FIG. 15*a* depicts complete filler block 1501.
FIG. 15*b* depicts support post 1507.

The present invention as shown in FIG. 15 introduces filler blocks 1501, 1502, 1503 and 1504 around idler gears 603 and fill much of empty spaces within tong body 100. This greatly reduces the volume of grease needed to fill and lubricate tong. Filler blocks 1501, 1502, 1503 and 1504 are positioned in close proximity to idler gears 603 and the sides of the filler blocks 1501, 1502, 1503 and 1504 adjacent the gear OD's employ sloped grease wells 1506. As a result, this configuration provides a means to capture and redirect the grease slung from idler gears 603 teeth back to idler gears 603 teeth. Additionally, the well area sloping toward the gear can be filled through grease nipple 401, positioned above said well. Fresh grease will move down the slope toward idler gear face 603 where it is needed. Additionally, since each idler gear 603 is circuitously connected to every other gear about the gear train, addition of grease through any grease nipple 401 located above any filler blocks 1501, 1502, 1503 or 1504 will reliably grease every gear within gear train 600. An additional benefit provided by the installation of filler blocks 1501, 1502, 1503 and 1504 is to act as a sound isolation barrier, reducing the total decibel output of the tong during operation.

FIG. 15 also shows a series of support posts 1507 countersunk into tong top and bottom plates 101 and 102. Said support posts 1507 secure filler blocks 1501, 1502, 1503 and 1504 onto tong top and bottom tong plates 101 and 102 using smaller flush head screws, thereby eliminating protrusions. Further, grease nipples 401 on the shafts comprise a flush mount style thereby further eliminating small protrusions from tong top and bottom plates 101 and 102, such surfaces prone to damage.

A typical tong has a great number of gears which can undergo high amounts of stress. There exist many failure modes for such gears including introduction of foreign debris, improper lubrication, and excessive loading above design limits. Whatever the failure mode, most often a gear will fail in a localized area. However, the entire gear will have to be removed and replaced. This often is an expensive proposition.

Figure 16:
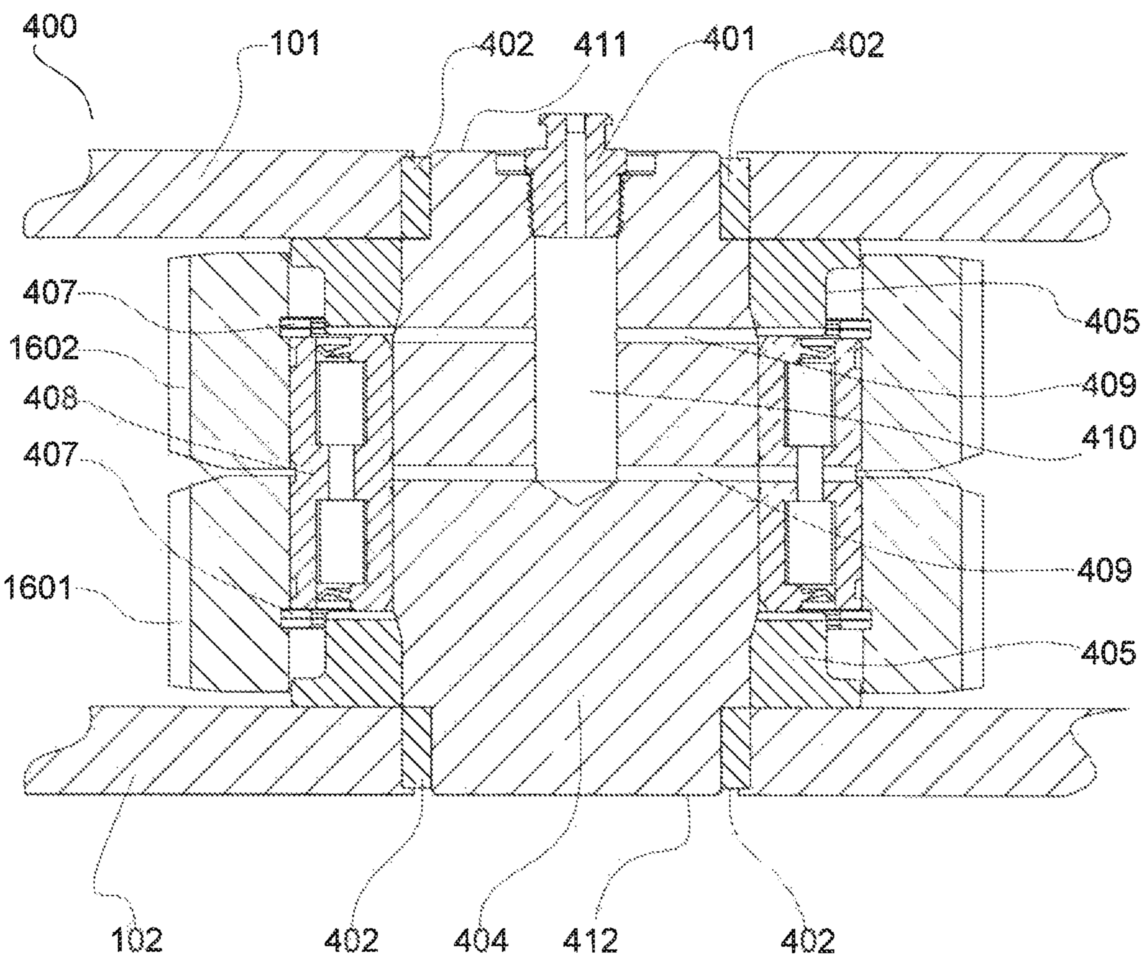
FIG. 16 depicts the use of modular stackable gears 1601 and 1602 in place of gear 406 as shown in FIG. 4, on single gear shaft 404.

The present invention provides modular stackable gears 1601 and 1602 as detailed FIG. 16. In the event of a localized failure of a gear; the failed stackable gear 1601 or 1602 may be replaced by a stackable gear 1601 or 1602 held in inventory rather than the entire gear. As stackable gears 1601 and 1602 are modular, all gears of a given diameter may be comprised of various number of gear segments of varying thickness to provide sufficient gear face width for a requisite load. The preferred embodiment of this invention, as shown in FIG. 16, uses two gears 1601 and 1602 of equal thickness that can replace the idler gear 603 as shown in FIG. 6. A modular gear system as shown in FIG. 16 may be employed to replace any single gear that is subject to failure, modular stackable gear systems as described herein are not meant to be limited to power tongs, but may be employed in any gear train configuration. Such gear segments held in inventory provide quick and cost-effective repair of a given gear.

Typically, conventional tongs have a stop pin or reversing pin. This pin is used to help align the cage plate throat with a rotary gear throat and release the jaw assembly from the tubular. This pin is either moved manually from one position to another, or by using hydraulic cylinder(s) to push the pin into position. When remote actuation is desired two very large hydraulic cylinders are positioned directly above the respective make and break positions in close proximity to the tubular member to be rotated. The operator would activate the appropriate cylinder to effect either insertion or retraction of the desired pin.

Figure 17:
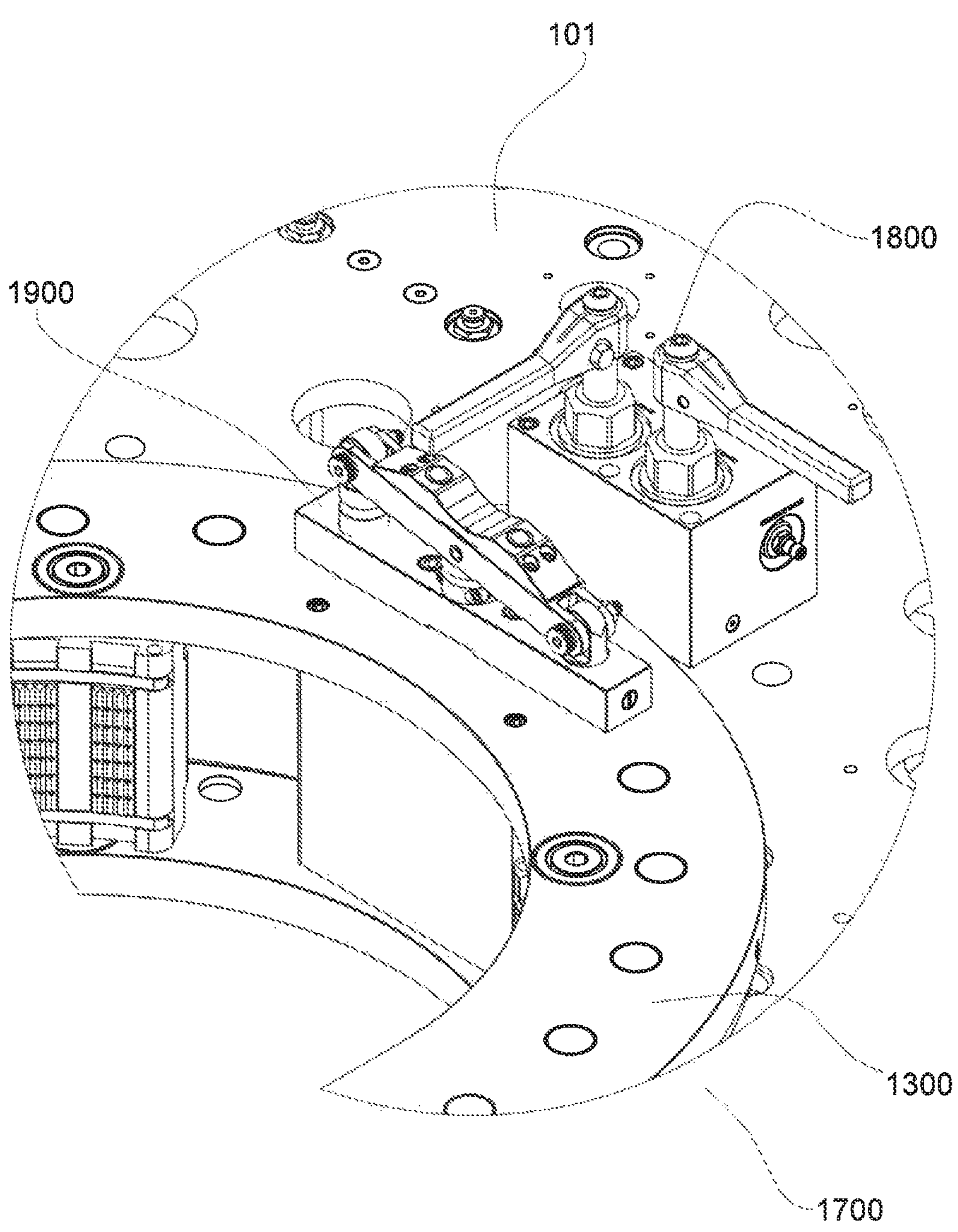
FIG. 17 depicts a partial view of a tong body 10 with make and break system 1700 consisting of make and break actuator assembly 1800 and rocker arm assembly 1900.
Figures 18, 18A:
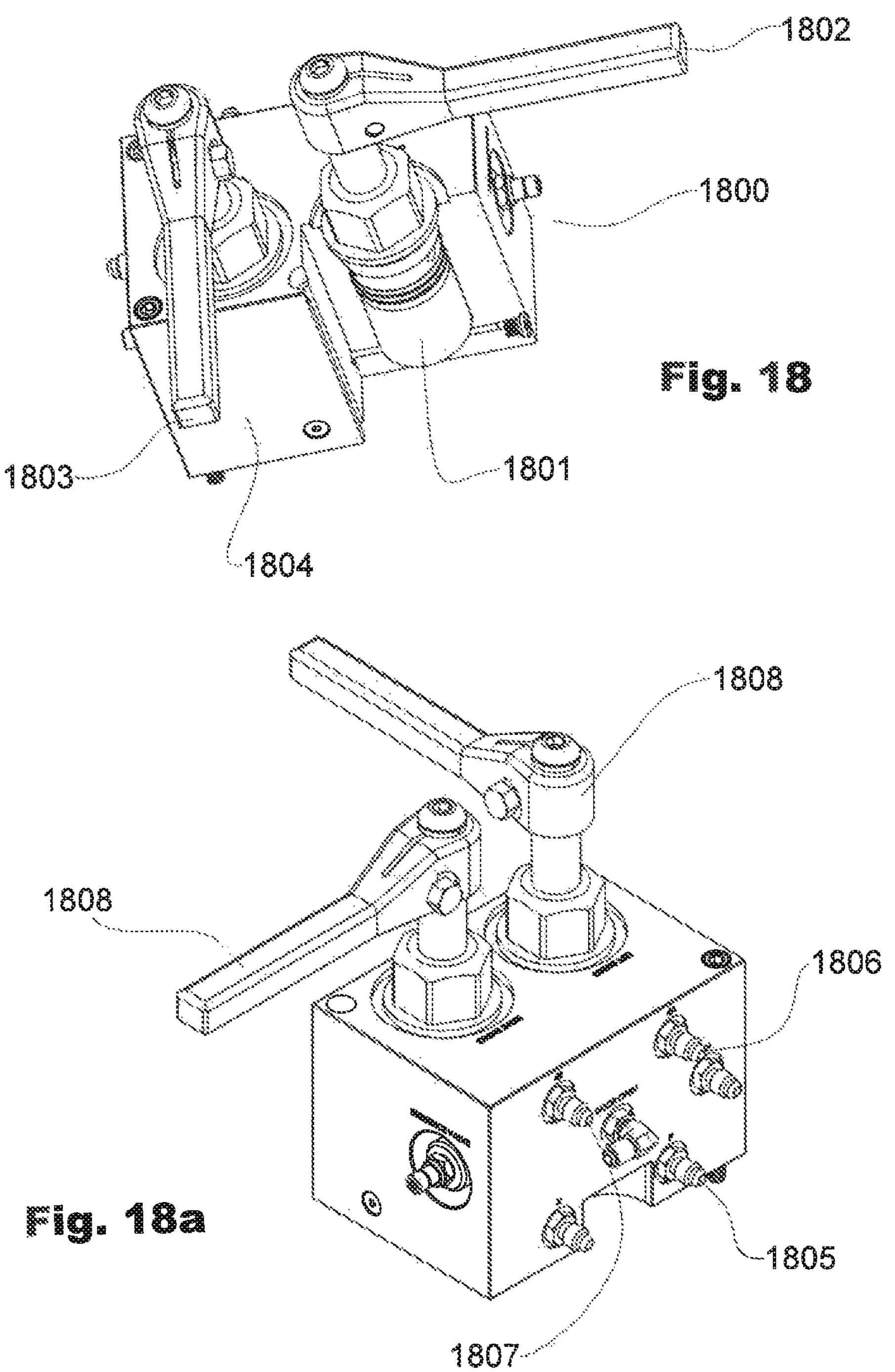
FIG. 18 depicts a cut away section view of make and break actuator assembly 1800.
FIG. 18*a* depicts make and break actuator assembly 1800 from a different angle revealing make actuator port 1806 and break actuator port 1807.

FIG. 17 depicts make and break system 1700 consisting of make and break actuator assembly 1800 and rocker arm assembly 1900. The present invention uses dual rotating cylinders 1801, as shown in FIG. 18 and FIG. 18*a*, fixed within make and break actuator assembly 1800 mounted on tong top plate 101, away from a tubular member and cage plate 1301, behind rocker arm assembly 1900. When actuated, swing arm 1808 from respective rotating cylinder 1801 rotates (typically, 90 degrees) from swing arm retracted position 1802 to swing arm deployed position 1803. When rotating cylinder 1801 is de-energized, swing arm 1808 rotates back to the swing arm retracted position 1802.

Figures 19, 19A:
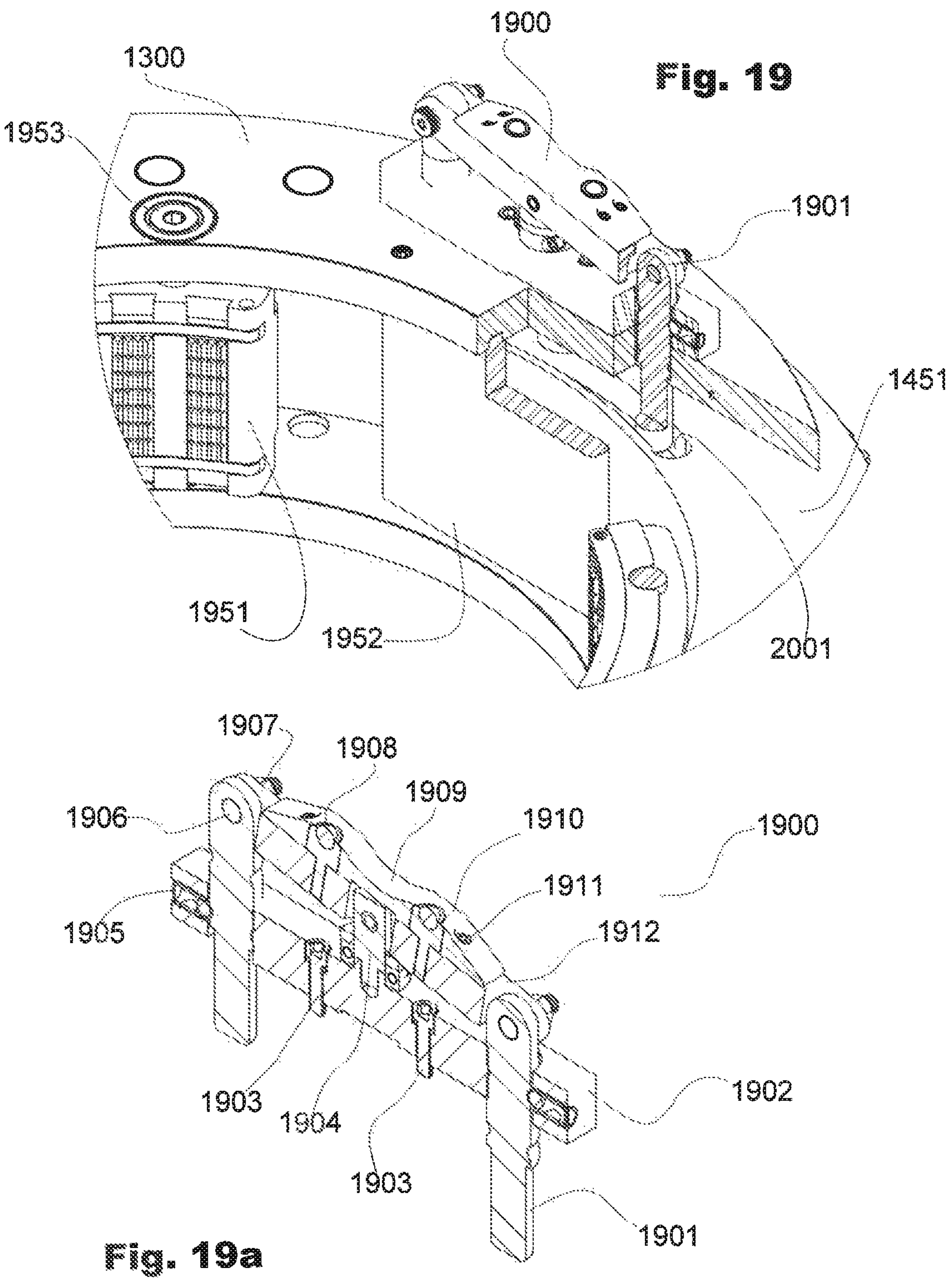
FIG. 19 depicts a close-up section of power tong 10 with a cut away view of rocker arm assembly 1900 mounted on cage plate assembly 1300.
FIG. 19*a* depicts a cross-section view of rocker arm assembly 1900.

FIG. 19 and FIG. 19*a* depict the rocker arm assembly 1900 of the present invention. When the swing arm 1808 moves to swing arm deployed position 1803 it pushes respective rocker pin 1901 down into a receiving make and break groove 2001 located on rotary gear 1451. After performing the make-up or break-out operation the engaged rocker arm pin 1901 enables decoupled rotation between rotary gear 1451 and cage plate 1301 in the opposite direction of said operation. This decoupling disengages the jaw assembly from the tubular. Rocker arm assembly 1900 simultaneously retracts opposite rocker pin 1901 out of position into a standby position. Such simultaneous retraction occurs because pivot arm 1910 attached to pivot base 1912 pivots over rocker arm base 1902 by means of pivot pin 1953. Rocker arm base 1902 being formed with end ramps such that swing arm 1808 can pivot into swing arm deployed position 1803 without any obstruction that could otherwise impede complete articulation. Further, as swing arm 1808 in swing arm deployed position 1803 begins to push rocker pin 1901 into position, transfer ball 1908 positioned between pivot arm 1910 and swing arm 1808 retards binding so as to ensure smooth and reliable engagement of rocker pin 1901 into make and break groove 2001. This configuration reduces risk of damage to power tong 10 by eliminating manual operation of make and break system 1700 and moving make and break actuating assembly 1800 away from the work area. Remote operation of power tong 10 also greatly reduces the risk of injury to personnel.

Figures 20, 20A:
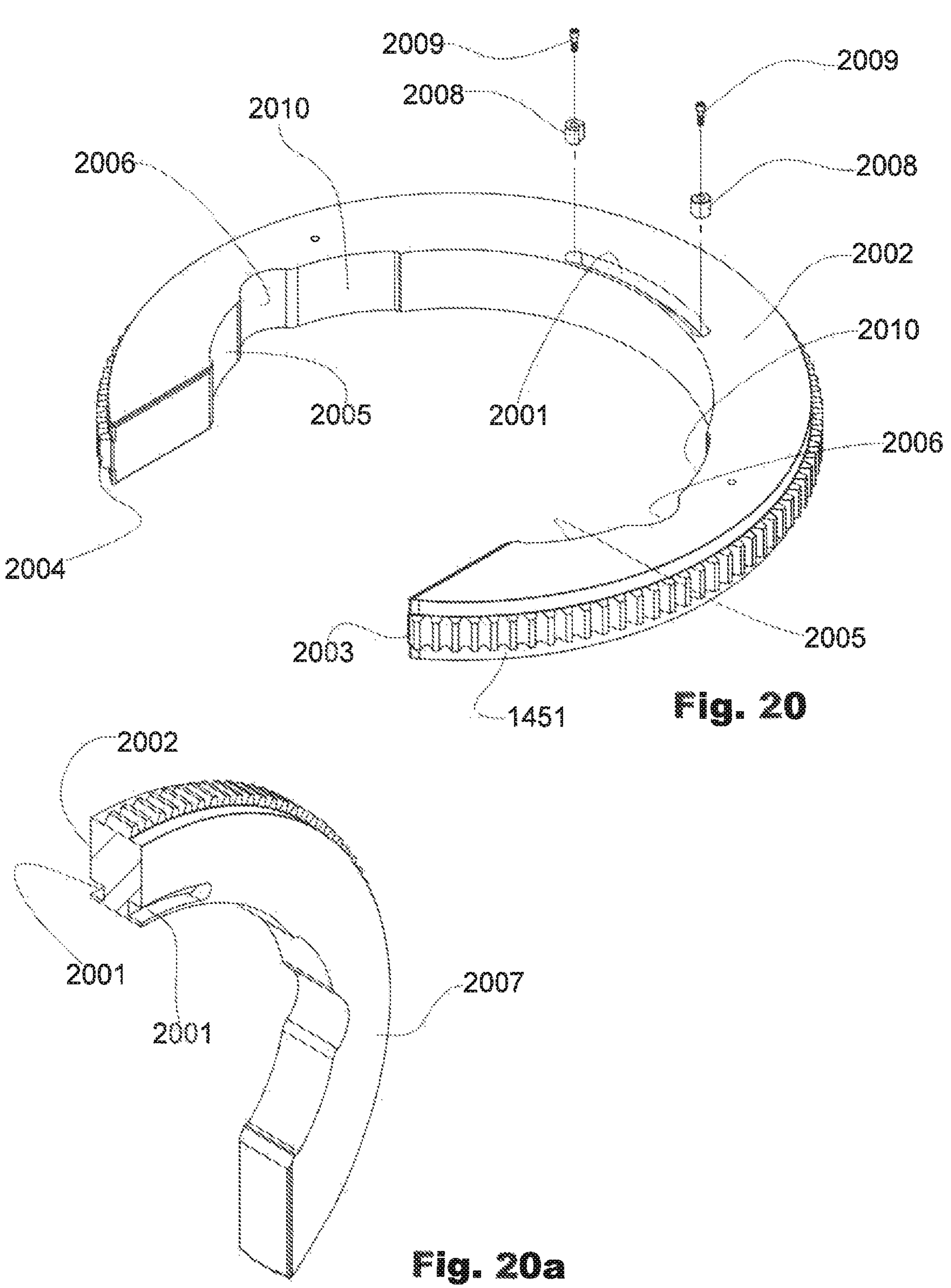
FIG. 20 depicts reversible rotary gear 1451.
FIG. 20*a* depicts a cross section view of reversible rotary gear 1451 with make and break grooves 2001 positioned opposite one another.

Rotary gear 1451 is the largest and most expensive gear in power tong 10. Maximum stress imposed on rotary gear 1451 occurs during the make-up cycle of a threaded connection as most all rotational moments imposed on rotary gear 1451 occur during make-up cycles as the need to break-out a connection occurs with far less frequency. The 1st make gear flank 2003, as shown in FIG. 20 adjacent the right side of the open throat of rotary gear 1451 undergoes the highest amount of stress of all gear teeth, followed by the 2nd, third, etc. This is because this leading edge of the rotary is prone to greatest expansion due to transferred torque. The 1st break gear flank 2004 adjacent the left side of the open throat of rotary gear 1451 undergoes the highest amount of stress attributable to the less frequent break-out cycling. Further, cam surfaces 2005 and 2010 associated with make-up cycles undergo more wear and stress than the cam surfaces associated with break-out cycles.

The present invention forms an additional make and break groove 2001 on rotary gear bottom 2007, opposite make and break groove 2001 formed on rotary gear top 2002. As rotary gear 1451 nears its useful life due to wear and stress, it is removed from tong body 100 and reinstalled upside down. Make gear flanks 2003 and break gear flanks 2004 change positions as well as the gear teeth leading edges. The bottom make and break groove 2001 replaces the top side make and break groove 2001, Break-out cam pockets become make-up cam pockets and vice versa. Importantly, the leading edge gear tooth for make-up becomes the lesser used leading edge gear tooth for break-out and vice versa. This increases the effective life cycle of rotary gear 1451 by nearly 100%. Optionally, make and break groove 2001 may be fitted with shock load bumpers 2008 at the ends of said groove, affixed with bumper screws 2009. Installed shock load bumpers serve to dampen the impact between make and break groove 2001 and rocker pin 1901, reducing the risk of damage to make and break system 1700.

A typical rotary gear has a limited range of tubular sizes it can accommodate. If the size of the tubular is smaller than said range, the conventional option would be to design and manufacture a jaw with the appropriate ID. Amongst other concerns, the weight of such a jaw assembly would render this option impractical.

The present invention discloses via FIG. 21, FIG. 21*a* and FIG. 21*b* rotary gear 803 which may accept a plurality of rotary gear inserts 2101, 2102 and segmented rotary gear inserts 2003. Said inserts attached to rotary gear 803 ID surface provide a means to modulated gripping pressure. A plurality of complimentary cage plates would accompany a plurality of rotary gear inserts, each progressive reduction in size in an embodiment wherein a modular rotary gear insert attaches to an adjacent rotary gear insert or rotary gear 803 by any number of means such that the attached surfaces encounter no relative movement between them during all service loadings. A series of interlocking mating tapered wedges would accomplish such attachment. Bolting said rotary gear inserts together or linking them by any other means is acceptable provided the joined mating surfaces meet joining criteria as described herein. Since each rotary insert could have more than one iteration, an insert could selectively adjust the cam pocket to modulate the amount of force used for any size to which rotary gear 803 is designed and under, any weight or grade of material. A typical rotary gear insert 2101 ID would proportionally mirror rotary gear 803 ID surface or an adjacent rotary gear insert. Rotary gear insert 2102 is dimensioned such that three jaws when engaged with the mating surface of a tubular member are spaced 120 degrees apart for even loading about a tubular member. This allows the jaw assemblies to completely wrap the tubular reducing the risk of damage to the tubular member during make and break cycles. Segmented rotary gear insert 2103 provides a means to reduce replacement costs should a given segment become damaged or unevenly worn. Such a system may reduce remediation costs by approximately 66%. Further, any rotary gear with a camming surface which has become worn may be refurbished to accept a suitable rotary gear insert formed with a camming surface to replace the original camming surface geometry of the original rotary gear. Such insert formed to also accept a plurality of inserts as described above. Such remediation will be a great cost benefit over replacement of the original rotary gear Conventional tong jaws typically have pin mounted rollers that interface with the cylindrical pocket located about the rotary gear ID, The diameter of the roller and the radius of the pockets on the rotary are optimized with respect to three variables; the overall dimensions on the power tong, the largest size tubular to grip using the tong and a singular location on the pocket that the roller sits on when it is gripping the tubular outer diameter ("OD"). Within the constraints listed, the diameter of the roller often becomes a limitation to the amount of compressive force the roller can withstand and therefore restricts the amount of torque that can be transmitted through the jaws due to the limited contact area between the roller and rotary. This often causes the rollers or the rotary to crush or wear out, significantly reducing the clamping capacity of the tong.

Solid jaws, jaws with a solid non-rotatable face integrally formed into the jaw body are an alternate design to overcome the tong size limitation of a roller type jaw. Line contact between jaw face and rotary means the contact pressure on this embodiment is similar to roller type jaws. Another limitation is the non-rotatable face on the jaw is in sliding contact with the rotary pocket increasing the frictional forces between said surfaces. Maintenance, replacement and manufacturing solid jaws is thus far more expensive. In either embodiment as listed above, line contact between rotary and jaw exist and the angular location of contact is predetermined at the point of design. This angular location is commonly known as the cam angle and dictates the resultant radial clamping force on the tubular.

Tubulars of a given OD can vary with respect to wall thickness and material yield and strength and therefore require different clamping forces to optimize the structural integrity of the tubular members. Care must be taken to grip with appropriate force such that a tubular member is not damaged by excessive radial gripping force between a tong jaw and a tubular member nor insufficient radial force between a tubular member and a tong jaw such that when a rotational force is imparted to said tubular member, the tong jaws slide about the tubular member, scoring the surface and reducing the cross sectional area of the said tubular member wall.

Figure 22:
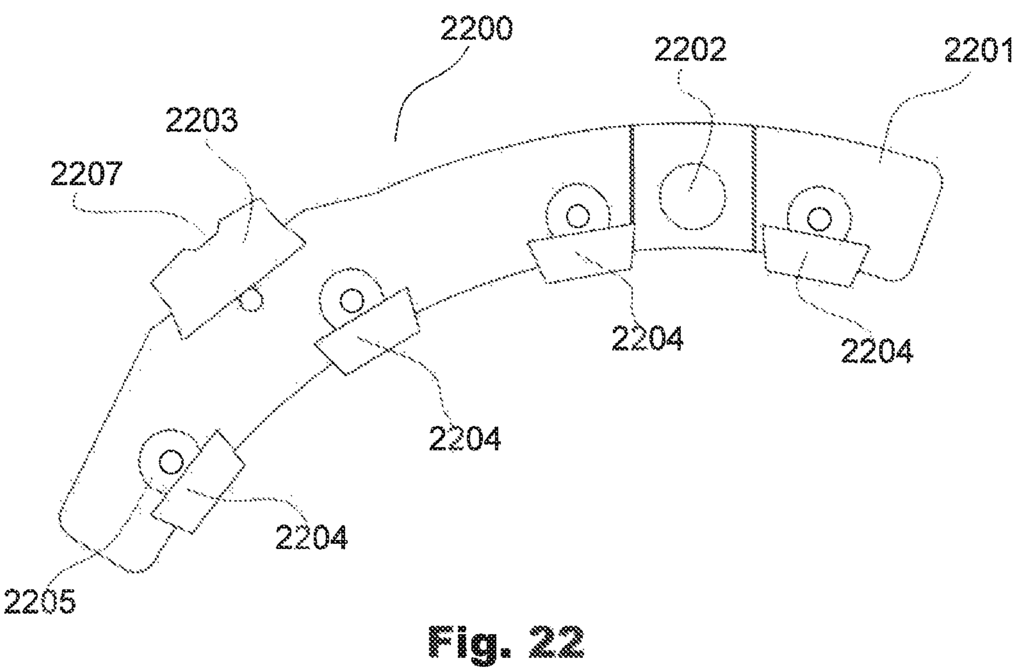
FIG. 22 depicts pivoting jaw assembly 2200 with cam shoe 2203.
Figure 23:
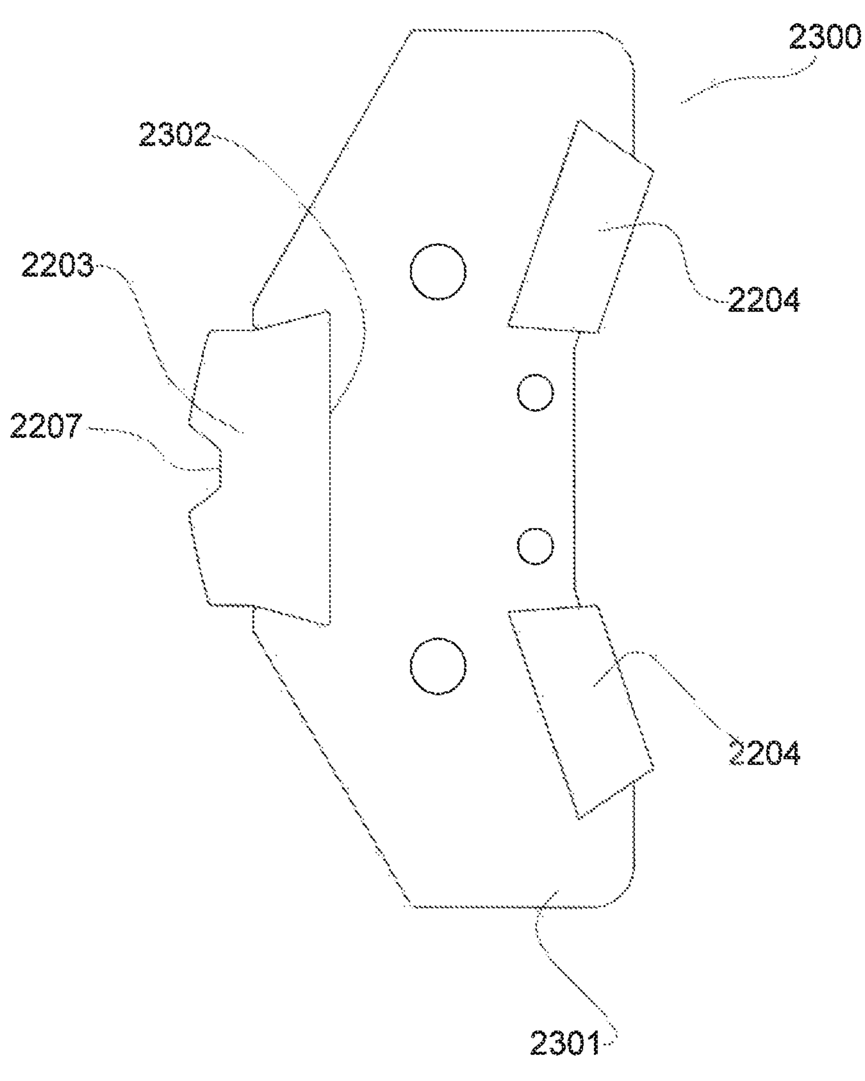
FIG. 23 Depicts sliding jaw assembly 2300 with cam shoe 2203.

Further, typical power tongs utilize either pivoting jaws as shown in FIG. 22 or sliding jaws as shown in FIG. 23. Irrespective to the iteration of jaws utilized the constraints remain.

Figure 22A:
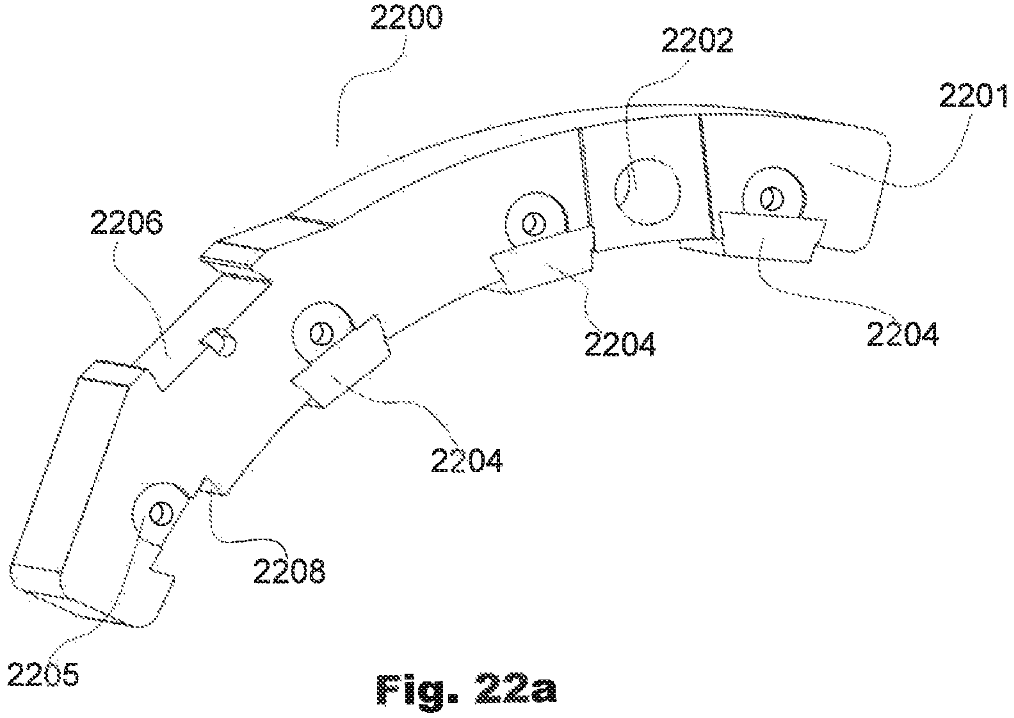
FIG. 22*a* depicts pivot jaw assembly 2200 showing cam shoe insert pocket 2206.

The present invention addresses contact stress at the cam surface 2006 and 2010 on rotary gear 1451 through the use of cam shoe insert 2203. FIG. 22 depicts a pivot jaw assembly 2200 wherein pivoting jaw 2201 is formed with pivot pin hole which is axially disposed closer to one end of pivoting jaw 2201 than the other. Pivot pin 2502 secures pivot jaw assembly between cage plates 2504 forming the axis about which the pivoting jaw 2201 pivots. Cam shoe insert 2203 installed in cam shoe pocket 2206 as shown in FIG. 22*a* embodies the present invention.

Cam shoe insert 2203 may be dimensioned with a radius matching the radius of the cylindrical cam surface 2005 and 2010 on the rotary gear 1451, thereby increasing greatly the corresponding contact area and increasing greatly the wear life of those mating surfaces. This feature is applicable to sliding jaw assembly 2300 as shown in FIG. 23.

Considering cam shoe insert 2203 presents a sliding contact with the mating cam surfaces 2005 and 204, lubrication and clean maintenance of the mating surfaces is critical. Cam shoe insert 2203 features collection pocket 2207 which collects grease and debris which may otherwise become trapped between said shoes and cam surface 2005 and 2010.

Figure 24:
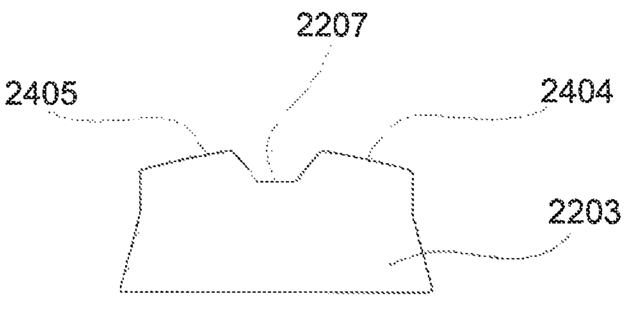
FIGS. 24, 24*a*, 24*b* and 24*c* depict cam shoe inserts 2203, 2401, 2402 and 2403, having various widths.
Figure 24A:
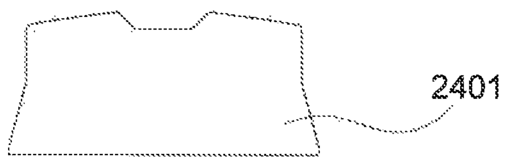
Figure 24B:
Figure 24C:
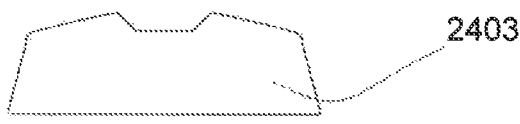

Additionally, the present invention addresses gripping pressure on the tubular member by utilizing one of a series of cam shoe inserts 2203, 2401, 2402 and 2403 as depicted in FIG. 24 through FIG. 24*c*. Said cam shoe inserts are dimensioned with different radial widths wherein the radial component of the force transferred from the rotary gear 1451 through the pivoting jaw 2201 or sliding jaw 2301 to grip the tubular member may be altered simply by installing a different cam shoe insert.

Optionally, divots or other shallow grease retaining cavities may be formed about the surface of the cam shoe inserts 2203, 2401, 2402 and 2403 to decrease the sliding coefficient of friction as the formed grease may hydraulically resist contact with its mating surface.

The cam shoe inserts 2203, 2401, 2402 and 2403 can be made to be sacrificial and thereby the first to wear and the replacement of said shoe is inexpensive and quick. Because cam shoe inserts 2203, 2401, 2402 and 2403 can be selectively sized radially, a properly sized shoe can be utilized for any size, weight or grade of tubular.

Further, as the clamping force required for tubular make-up is typically lower than for tubular break out. Cam shoe inserts 2203, 2401, 2402 and 2403 are all designed to have two distinct surfaces 2404 and 2405 as shown in FIG. 24. The radial thickness of the cam shoe insert can be varied preferential at either said surfaces to transfer the differential gripping force during make-up cycles vs. break-out cycles.

Combining the flexibility of utilizing variably sized cam shoes as disclosed herein, contact pressures can now be infinitely adjustable on both the make up as well as the breakout for any size weight or grade tubular.

When a power tong is making or breaking a threaded connection, jaw dies are in gripping contact with a tubular member. To engage the dies against a tubular member, the cam follower travels about the camming surface of a rotary gear until the cam follower wedges tightly between the tubular member and the cam surface. The arc length of the cam surface is designed to permit a prescribed range of travel of contact location between the rotary gear and the cam follower.

Overtravel is a condition wherein the cam follower travels beyond the appropriate location along the cam surface. Once the cam follower over travels the appropriate surface location, it becomes very difficult to disengage the jaw assembly from the tubular member, such that sacrificing the tubular becomes necessary to separate it from the power tong.

Many conditions exist which may precipitate said overtravel. The cam surface of the rotary gear and/or the cam follower of a sliding or rolling jaw may wear, deform, or fracture such that the cam follower jumps past its end of travel position. A jaw die having an undersized radial thickness may be unintentionally installed on the jaw assembly. Should the outer diameter of the tubular member become deformed inwardly due to application of high torque, or by any other means, the jaw assembly may overtravel the cam surface. The same condition could happen if the tubular member is undersized or out of round. If torque is applied beyond the capability of the power tong, then the open end of the rotary gear may expand and likewise allow the cam follower to overtravel.

Figures 26, 26A, 26B:
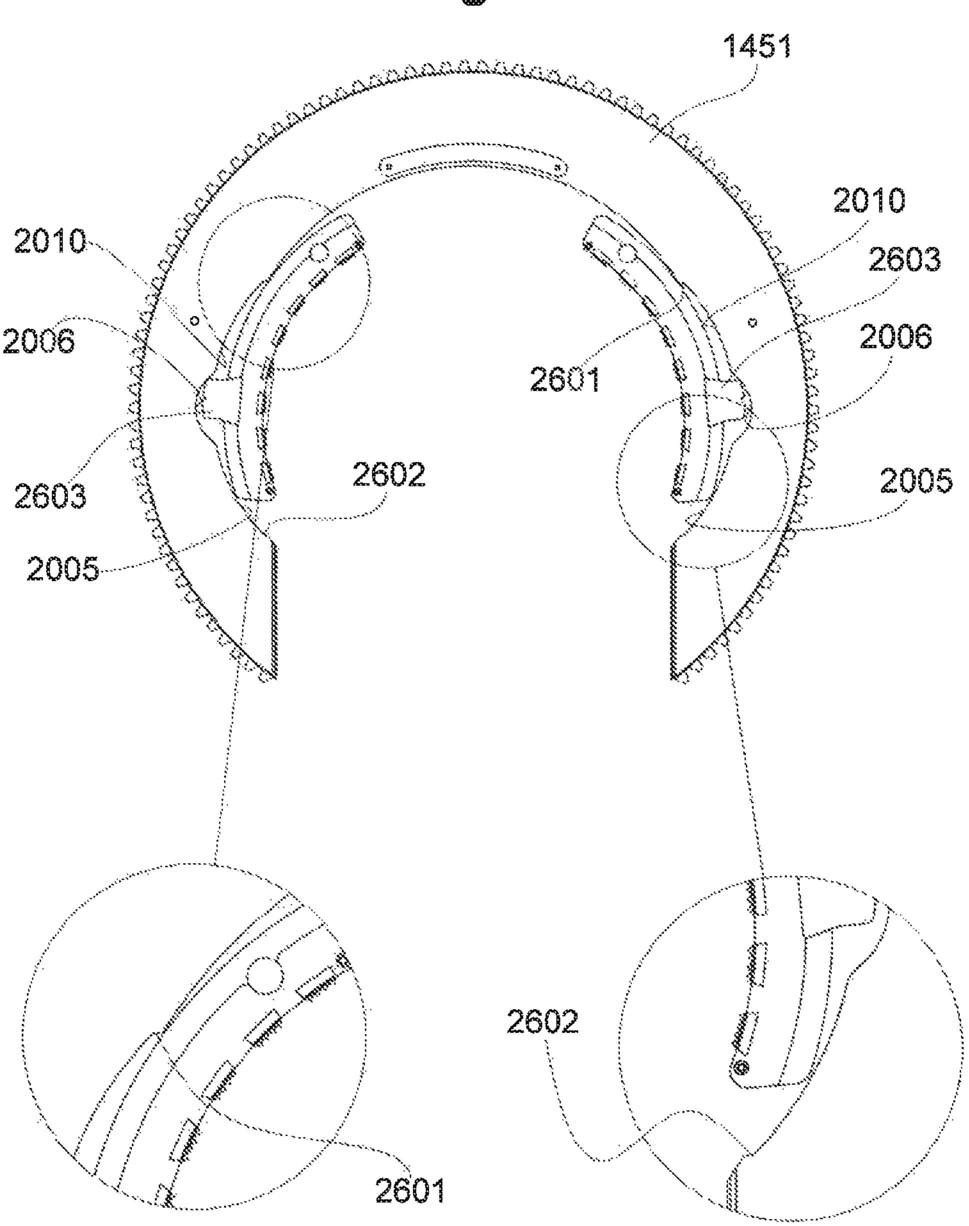
FIG. 26 depicts rotary gear 1451 with symmetrical cam surfaces 2005 and 2010 and symmetrical neutral cam pockets 2006.
FIG. 26*a* and FIG. 26*b* depicts overtravel stops 2601 and 2602.

FIG. 26 depicts rotary gear 1451 of the present invention which discloses a specially formed cam surface with overtravel stops 2601 and 2602 which act as abutments to keep cam shoes 2603 from overtravel. The overtravel stops 2601 and 2602 protect against overtravel whether rotary gear 1451 is travelling in a clockwise or counterclockwise direction. Overtravel stops 2601 and 2602 may be dimensioned to cooperate with either pivot jaw assembly 2200 or sliding jaw assembly 2300.

Conventional power tongs are fitted with large doors that swivel open to receive a tubular member into the center of a rotary gear. Such doors are heavy, work as a structural brace to the tong body and must operate reliably. Due to wear in door hinge mechanisms or external impact, a door may become misaligned to the tong body. An unreliable latching mechanism can pose a significant safety risk and impede the functioning of the power tong. Conventional tongs may employ a lobate hinge pin such that as the camming pin profile rotates about the round mating hinge pin hole, the tong door is centralized to the tong body latch by wedging the camming surface of the hole against the lobate cam when the door is in the closed position. However, the hinge pin hole can wear easily, and the lobate pin surface may likewise wear or deform. As such, a tong door may become non-concentric to the rotary gear. The tong door latch pin may also droop or rise relative to the tong body.

Figure 27:
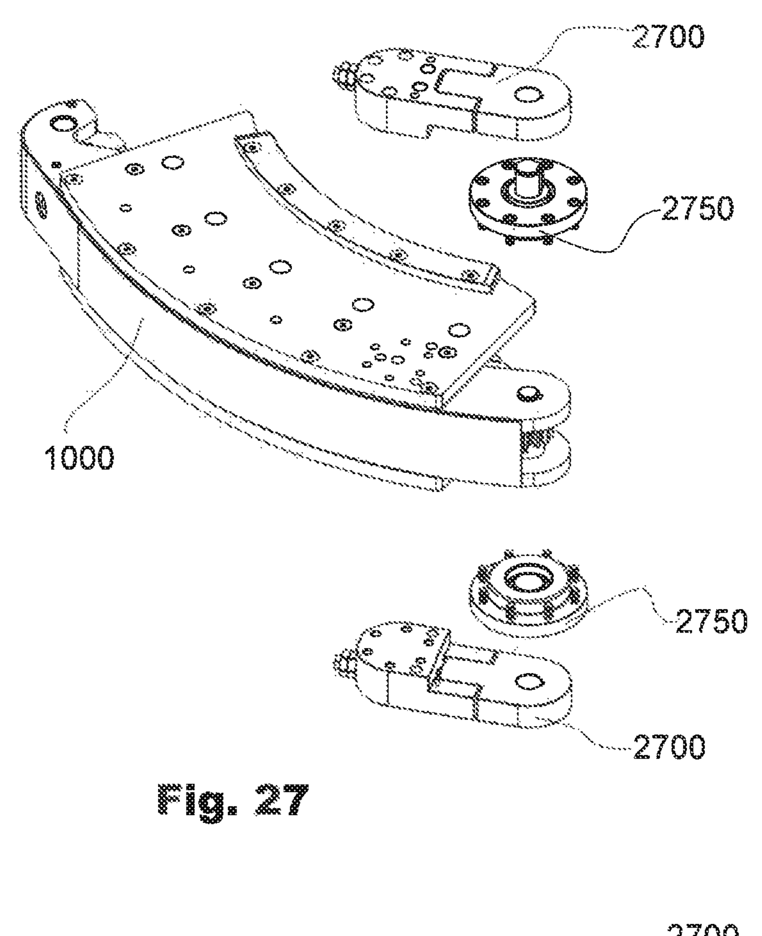
FIG. 27 depicts an exploded view of door alignment assembly 2700 mounted on door assembly 1000.
Figure 27A:
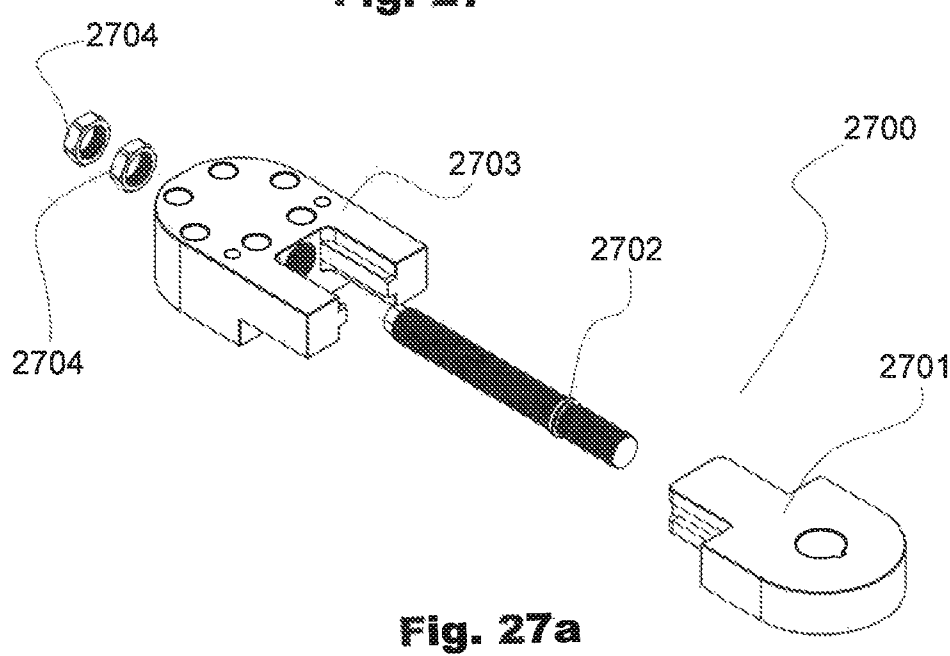
FIG. 27*a* depicts an exploded view of door alignment assembly and its components, adjustable body plate 2701, adjustment screw 2702, adjustable door plate 2703 and lock nuts 2704.

FIG. 27 depicts door alignment assemblies 2700 which incorporates onto tong top plate 101, tong bottom plate 102 and tong door assembly 1000. Adjustable body plates 2701 are affixed to the door hinge side of tong top plate 101, tong bottom plate 102 and are connected by adjustment screws 2702 to adjustable door plates 2703 which are affixed to tong door assembly 1000. Adjustment screws 2702 are formed with two segments having opposite handed threads such that rotating said screw will either draw together or push apart adjustable body plates 2701 and adjustable door plates 2703. Door alignment assemblies 2700 may be independently adjusted on the top and bottom of tong body 100 and tong door 1000. Therefore, should tong door assembly 1000 become non-concentric to rotary gear 1451, adjustment screws 2702 can be cooperatively adjusted to return tong door assembly 1000 and rotary gear 1451 to a concentric state, Further, should tong door assembly 1000 droop or rise relative to tong body 100, adjustment screws 2702 can reliably adjust tong door assembly 1000 to be level with tong body 100. If tong door assembly 1000 has drooped relative to tong body 100, then upper adjustment screw 2702 can be put in tension and lower adjustment screw 2702 can be put in compression to provide support to tong door 1000 on both sides. Conversely, if tong door assembly 1000 has risen relative to tong body 100, then upper adjustment screw 2702 can be put in compression and lower adjustment screw 2702 can be put in tension to provide support to tong door assembly 1000 on both sides.

It is desirous for a power tong to be able to assemble a wide range of tubular sizes. One method conventional tongs employ, is to have jaw sets of various radial thicknesses made such that a given jaw set is dimensioned to extend radially inward to a desired dimension suitable for a given diameter range of tubular members. While such a system can satisfy the requirement as stated above, the cost to cover all the jaws needed is exorbitant and the total mass of the jaw sets makes them cumbersome to use and transport.

Another method developed is the use of cascading spacers with jaw sets wherein spacers formed with mating splines are stacked between the rotary gear and a jaw size needed in quantities sufficient to locate the jaw in the correct diametral position for a given tubular range. Such a system can likewise satisfy the requirement as stated above but also has limitations. Unlike the previous iteration, the intermediate spacers do not have jaw faces and cannot be used to directly interface with tubulars. A separate jaw set for each size of tubular range is required. This iteration is an improvement but is likewise costly and cumbersome.

Figures 28, 28A, 28B:
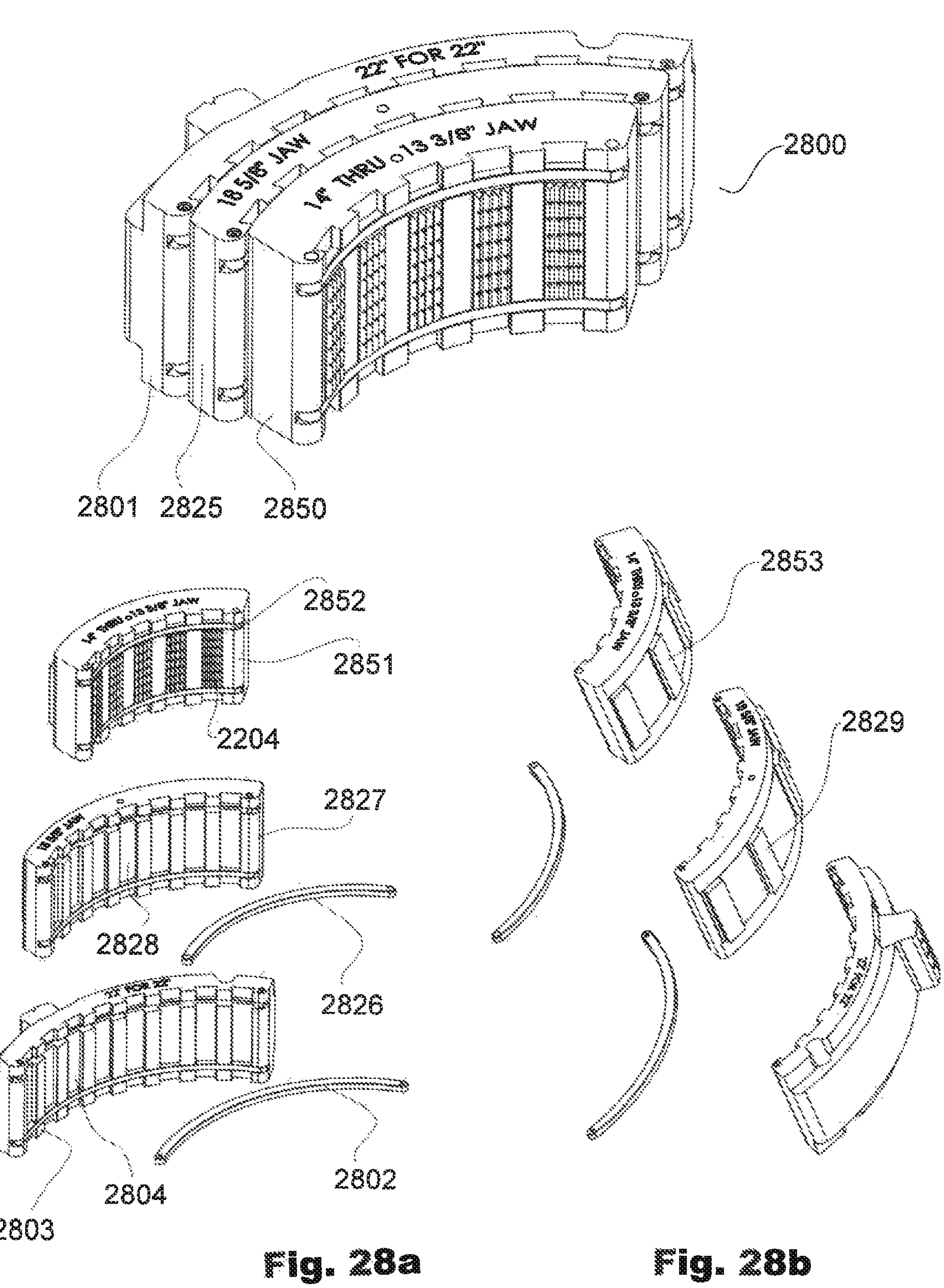
FIG. 28 depicts stackable jaw assembly 2800 with main jaw assembly 2801, intermediate jaw assembly 2825 and final jaw assembly 2850.
FIG. 28*a* depicts an exploded view of the stackable jaws separated.
FIG. 28*b* depicts male dovetail 2829 and 2853, used to cascade the jaws together.

FIG. 28 depicts stackable jaw assembly 2800 wherein functional jaw sets are used as stackable spacers to locate a given jaw set to its intended radial position. The first jaw set is the main jaw assembly 2801 dimensioned to rotate a tubular member with the greatest OD for which the tong was designed. As an example represented in FIG. 28*a*, for tong assembly 4, main jaw 2803 is dimensioned for 22" tubulars, if 18⅝" tubulars are to be mated, intermediate jaw 2827 will mate to main jaw 2803 by sliding male dovetails 2829 located along the outer radius of intermediate jaw 2827, dimensioned to cooperate with insert pockets 2804 located along the inner radius of main jaw 2803. By dimensioning both jaw insert 2204 and male dovetails 2829 and to fit into insert pockets 2804, each jaw size smaller than main jaw 2803 can be used either as a spacer or as the final jaw set which interfaces with a tubular member. The concept can be further extended when 14" tubulars are to be mated by sliding male dovetails 2853 on final jaw 2851 into insert pocket 2828. The system of stackable jaws may be formed as pivoting jaws as depicted herein or sliding jaws by suitably altering main jaw assembly 2801 alone. This stackable jaw system is far more cost effective than the other commercially available systems and because the stackable jaw system uses significantly less material, it is easier to use store and transport.

Figure 25:
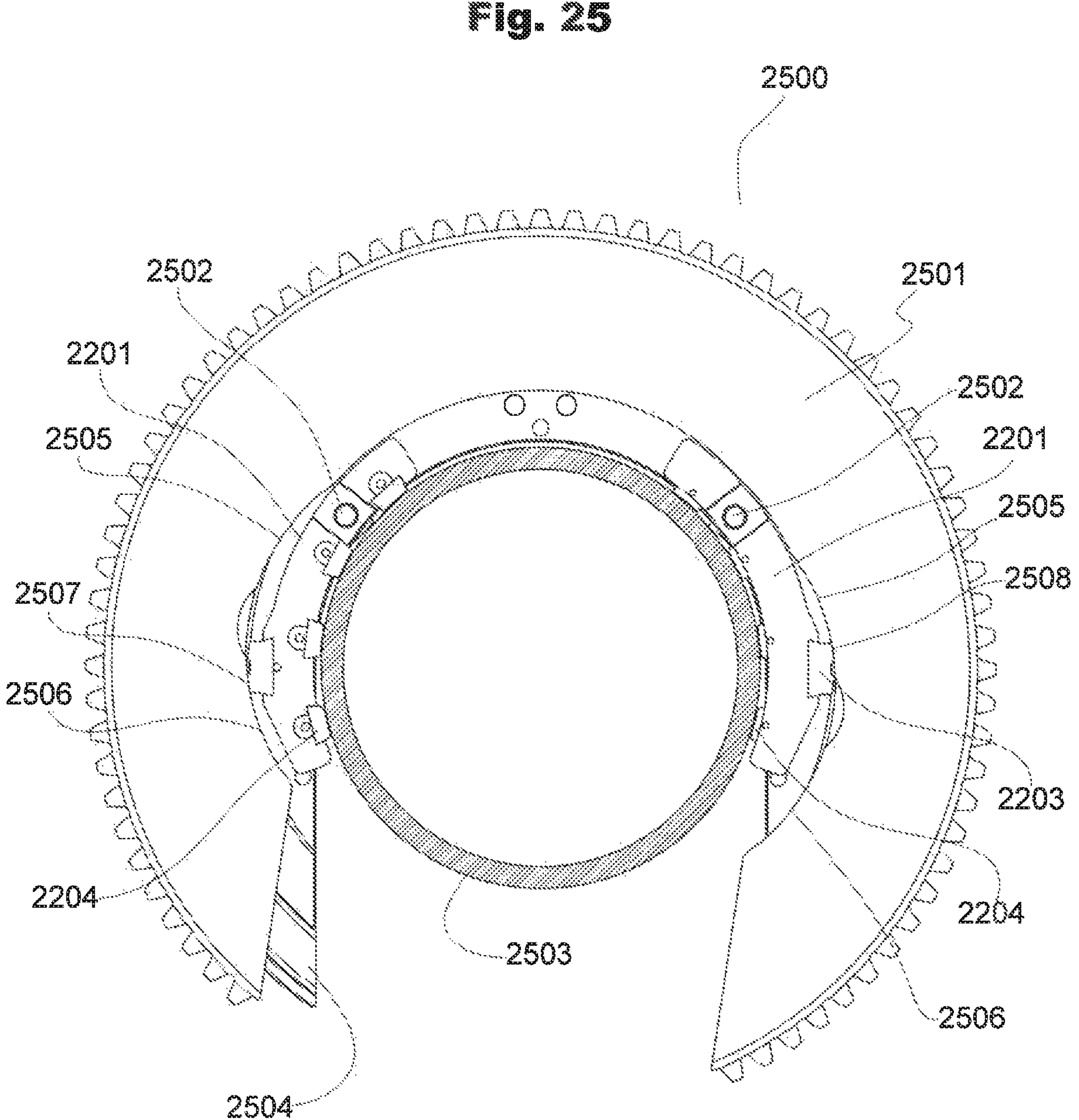
FIG. 25 depicts a rotary gear assembly in which rotary gear 2501 with pivoting jaws assemblies 2200 and cage plate 2504 fixed about tubular member 2503.

Dies affixed to the leading edge of jaw meant to grip the tubular member's surface can be press fit into a tong jaw as shown in FIG. 25. A small weld bead may be added under the dies to prevent them from pulling out of the jaw under heavy loading, large head screws may also be used to retain the dies. During the operation of the tong, the operator must visually confirm jaws are in the open position prior to attempting to secure another tubular. Conventionally, this is often done with a wooden pole, which is not ideal for a number of reasons. Additionally, should an insert break from their mounting point and fall into the wellbore the die(s) would have to be fished out of the well, usually at great expense.

The present invention, as depicted in FIG. 28*a* modifies the jaw assemblies 2801, 2825 and 2850 to add a groove above and below the dies. A plate 2802, 2826 or 2851 is then attached into these grooves retaining the dies with both the strength of the plate and the material in the jaw opposite the dies.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed is:

1. A power tong apparatus for selectively applying torque forces to tubulars comprising:

a) a body section defining a central opening and a gap extending into said central opening;

b) a gear train disposed within said body section;

c) a rotary gear disposed adjacent to the central opening;

(d) a plurality of dies moveably disposed within said body section around said central opening and operationally attached to said gear train, wherein said plurality of dies are configured to grip a tubular;

(e) a modular transmission assembly configured to selectively apply force to said gear train, wherein said transmission assembly further comprises:

a transmission box housing removably attachable to said body section;

a plurality of drive gears held within a shift gear assembly, disposed within said transmission box housing; and two or more sets of mating gears disposed within said transmission box housing, and configured to provide a plurality of speeds of the rotary gear, after said transmission box housing is selectively attached to said body section; and wherein said transmission box housing is configured to be selectively affixed to, and disconnectable from, the body section.

2. The power tong apparatus of claim 1, wherein said modular transmission assembly further comprises a sealing element at the interface of the modular transmission assembly and said body section.

3. The power tong apparatus of claim 1, wherein said gear train comprises a plurality of idler gears substantially encircling said body section.

4. The power tong apparatus of claim 1, further comprising a door hingedly attached to said body section by an actuating mechanisms which are contained within said body section, and wherein said actuating mechanisms selectively alternate said door between a first closed position wherein said gap is obstructed and a second open position wherein said gap is unobstructed, and wherein at least one idler gear is disposed within said door.

5. The power tong apparatus of claim 4, wherein the idler gears of said gear train are in constant meshing contact with the at least one idler gear within said door when the door is in both the first closed position and the second open position.

6. The power tong apparatus of claim 4, wherein said actuating can be remotely controlled from a desired distance away from said power tong apparatus.

7. The power tong apparatus of claim 4, wherein said actuating mechanisms comprise a rotary actuator, or rack and pinion assembly.

8. The power tong apparatus of claim 1, wherein said body section further comprises a top plate and a bottom plate and defines a distance there between, and wherein at least two gears of said gear train extend substantially across said entire distance defined between said top and bottom plates.

9. The power tong apparatus of claim 8, wherein each of said plurality of drive gears has a length, and wherein a length of at least one of said drive gears is substantially equal to said distance between said top and bottom plates of said body section.

10. The power tong apparatus of claim 1, further comprising:

a door latch assembly disposed within said body section adjacent a tong door end and a door actuator assembly comprising a door cylinder and a door rack disposed within a tong body adjacent an opposite tong door end having a door actuator pin, said pin hingedly connected to the adjacent tong door body, said actuator pin further comprising a pinion gear disposed about a pin shaft, said pinion gear cooperating with a door rack having a plurality of teeth thereupon, said rack connected to a door cylinder to transmit rotational force to said door actuator pin;

wherein said door latch assembly further comprising a latch lever energized by a latch cylinder, the energized lever causes a door latch to separate from a latch cam, a spring pulls said latch cam to its open position thereby releasing it from the latch pin, said door cylinder is then energized to retract door rack and transmit counter-clockwise rotational force through said door actuation pin, said door latch lever is spring loaded to roll it clockwise to its open position thereby positioning said tong door to an open position;

wherein as said door cylinder is energized to extend, said door rack teeth cooperating with pin pinion gear to transmit clockwise rotational force through said door actuation pin, thereby positioning tong door in the closed position, said door latch engages against a latch cam preventing the tong door to return to an open position during rotation of the rotary gear.

11. A power tong apparatus for selectively applying torque forces to tubulars comprising:

a) a body section defining a central opening and a gap extending into said central opening, wherein said body section further comprises a top plate and a bottom plate having a distance there between;

b) a plurality of idler gears disposed within said body section between said top plate and said bottom plate;

c) a rotary gear operationally engaged with said plurality of idler gears;

d) a plurality of dies moveably disposed within said body section around said central opening and operationally attached to said rotary gear, wherein said plurality of dies are configured to grip a tubular;

e) a door hingedly attached to said body section by an actuating mechanisms which are contained within said body section, and wherein said actuating mechanisms selectively alternate said door between a first closed position wherein said gap is obstructed and a second open position wherein said gap is unobstructed, and wherein at least one of said plurality of idler gears is disposed within said door; and f) a modular transmission assembly configured to selectively apply force to said plurality of idler gears, wherein said modular transmission assembly further comprises:

a transmission box housing removably attachable to said body section;

a plurality of drive gears held within a shift gear assembly, disposed within said transmission box housing; and two or more sets of mating gears disposed within said transmission box housing, and configured to provide a plurality of speeds of the rotary gear, after said transmission box housing is selectively attached to said body section; and wherein said transmission box housing is configured to be selectively affixed to, and disconnectable from, the body section.

12. The power tong apparatus of claim 11, wherein said modular transmission is replaceable with a separate transmission assembly.

13. The power tong apparatus of claim 11, wherein said modular transmission assembly further comprises a sealing element at the interface of the modular transmission assembly and said body section.

14. The power tong apparatus of claim 11, wherein said gear train comprises a plurality of idler gears substantially encircling said body section.

15. The power tong apparatus of claim 11, wherein the plurality of idler gears are in constant meshing contact with the at least one idler gear within said door when the door is in both the first closed position and the second open position.

16. The power tong apparatus of claim 11, wherein said actuating mechanisms can be remotely controlled from a desired distance away from said power tong apparatus.

17. The power tong apparatus of claim 16, wherein said actuating mechanisms comprises a rotary actuator, or rack and pinion assembly.

18. The power tong apparatus of claim 11, wherein at least two of said idler gears have a length that is substantially equal to said distance between said top and bottom plates of said body section.

19. The power tong apparatus of claim 11, wherein each of said plurality of drive gears has a length, and wherein a length of at least one of said drive gears is substantially equal to said distance between said top and bottom plates of said body section.

20. The power tong apparatus of claim 11, wherein said rotary gear is configured to be removed and reinstalled upside down to engage with said plurality of idler gears.

21. The power tong apparatus of claim 11, further comprising at least one replaceable insert member removably disposed between said rotary gear and said plurality of dies.

22. A power tong apparatus to grip and selectively apply torsional forces on tubular members comprising:

a. a motor;

b. a body section comprising a top plate, a bottom plate and a spacer, said body section having a central opening and a gap, wherein the central opening comprises a rotary gear housing a plurality of jaws movably disposed, wherein said plurality of jaws are configured to grip a tubular member;

C. a gear train driven by said motor;

d. at least one door hingedly attached to said body section and configured to selectively alternate between a first closed position wherein said gap is obstructed and a second open position wherein said gap is unobstructed;

e. at least one filler block inserted within said body section, wherein said at least one filler block is radially disposed about the gears of the said gear train;

a door latch assembly disposed within said body section adjacent a tong door end and a door actuator assembly comprising a door cylinder and a door rack disposed within a tong body adjacent an opposite tong door end having a door actuator pin, said pin hingedly connected to the adjacent tong door body, said actuator pin further comprising a pinion gear disposed about a pin shaft, said pinion gear cooperating with a door rack having a plurality of teeth thereupon, said rack connected to a door cylinder to transmit rotational force to said door actuator pin;

wherein said door latch assembly further comprises a latch lever energized by a latch cylinder, the energized lever causing a door latch to separate from a latch cam, a spring pulls said latch cam to its open position thereby releasing it from the latch pin, said door cylinder being energized to retract the door rack and transmit counterclockwise rotational force through said door actuation pin, said door latch lever being spring loaded to roll clockwise to a spring open position thereby positioning said tong door to an open position;

wherein as said door cylinder is energized to extend, said door rack teeth cooperate with pin pinion gear to transmit clockwise rotational force through said door actuation pin, thereby positioning said tong door in a closed position, said door latch engaging against the latch cam preventing the tong door to return to an open position during rotation of the rotary gear.

23. The power tong apparatus of claim 22, wherein said at least one filler block comprises a slope at least partially transecting the at least one filler block between the top and bottom plate.

* * * * *